(12) United States Patent
Ohta et al.

(10) Patent No.: US 9,055,494 B2
(45) Date of Patent: Jun. 9, 2015

(54) MOBILE CONTROL DEVICE AND HANDOVER CONTROL METHOD

(75) Inventors: Yoshiaki Ohta, Kawsasaki (JP);
Yoshiharu Tajima, Kawasaki (JP);
Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 12/787,611

(22) Filed: May 26, 2010

(65) Prior Publication Data
US 2010/0232394 A1    Sep. 16, 2010

Related U.S. Application Data

(60) Division of application No. 12/144,847, filed on Jun. 24, 2008, now Pat. No. 8,532,659, which is a continuation of application No. PCT/JP2005/023895, filed on Dec. 27, 2005.

(51) Int. Cl.
*H04W 4/00* (2009.01)
*H04W 24/00* (2009.01)
(Continued)

(52) U.S. Cl.
CPC .............. *H04W 36/08* (2013.01); *H04W 36/18* (2013.01); *H04W 80/04* (2013.01); *H04W 92/12* (2013.01);
(Continued)

(58) Field of Classification Search
CPC ....... H04W 88/02; H04W 4/02; H04W 88/06; H04W 36/30; H04W 36/18; H04W 36/08
USPC ........... 455/422.1, 436, 440, 442, 404.1, 423, 455/502, 562.1, 437, 438, 442.1, 522, 455/553.1; 370/331, 350, 10.1, 329, 332
See application file for complete search history.

(56) References Cited

U.S. PATENT DOCUMENTS 5,127,100 A * 6/1992 D'Amico et al. .......... 455/422.1
5,404,573 A * 4/1995 Yabe et al. ..................... 455/423
(Continued)

FOREIGN PATENT DOCUMENTS

CN    1402486      3/2003
EP    1 320 274    6/2003
(Continued)

OTHER PUBLICATIONS

European Search Report Aug. 9, 2010, from corresponding European Application No. 10 16 3947.

(Continued)

*Primary Examiner* — William D Cumming
(74) *Attorney, Agent, or Firm* — Katten Muchin Rosenman LLP

(57) ABSTRACT

The present invention is a handover control method in a mobile communication system that performs handover control by switching base stations that communicate with a mobile terminal as the mobile terminal moves. In this handover control method, a mobile control device selects one or more handover base station candidates based on the communication state, and based on the communication capabilities of the handover base station candidates, decides a transmission rate for multicasting communication data, and transmits communication data to each of the handover base station candidates at the decided transmission rate, and a handover base station candidate that is decided as a handover base station sends the saved multicast communication data to the mobile terminal.

5 Claims, 26 Drawing Sheets

(51) Int. Cl.
*H04W 36/00* (2009.01)
*H04W 40/00* (2009.01)
*H04B 7/00* (2006.01)
*H04M 1/00* (2006.01)
*H04B 1/38* (2006.01)
*H04W 36/08* (2009.01)
*H04W 36/02* (2009.01)
*H04W 36/28* (2009.01)
*H04W 36/18* (2009.01)
*H04W 80/04* (2009.01)
*H04W 92/12* (2009.01)
*H04W 88/14* (2009.01)

(52) U.S. Cl.
 CPC ........ *H04W 36/0072* (2013.01); *H04W 36/026* (2013.01); *H04W 88/14* (2013.01); *H04W 36/28* (2013.01); *H04W 36/02* (2013.01)
 USPC ........ 455/422.1; 455/423; 455/436; 455/437; 455/438; 455/440; 370/329; 370/331; 370/332; 370/350

(56) References Cited

U.S. PATENT DOCUMENTS

| | | | | |
|---|---|---|---|---|
| 5,537,685 | A * | 7/1996 | Matsuno | 455/502 |
| 5,613,211 | A * | 3/1997 | Matsuno | 455/502 |
| 5,678,185 | A * | 10/1997 | Chia | 455/437 |
| 5,722,072 | A * | 2/1998 | Crichton et al. | 455/437 |
| 5,754,945 | A * | 5/1998 | Lin et al. | 455/436 |
| 5,794,149 | A * | 8/1998 | Hoo | 455/438 |
| 5,848,063 | A * | 12/1998 | Weaver et al. | 370/331 |
| 5,890,076 | A * | 3/1999 | Takano et al. | 455/561 |
| 5,960,347 | A * | 9/1999 | Ozluturk | 455/442 |
| 6,075,990 | A * | 6/2000 | Shin | 455/440 |
| 6,093,977 | A * | 7/2000 | Fujita et al. | 307/10.1 |
| 6,119,018 | A * | 9/2000 | Kondo | 455/522 |
| 6,157,837 | A * | 12/2000 | Kato et al. | 455/437 |
| 6,178,326 | B1 * | 1/2001 | Kalliokulju | 455/437 |
| 6,192,232 | B1 * | 2/2001 | Iseyama | 455/404.1 |
| 6,205,129 | B1 * | 3/2001 | Esteves et al. | 370/331 |
| 6,542,742 | B2 | 4/2003 | Schramm et al. | |
| 6,704,581 | B1 * | 3/2004 | Park et al. | 455/553.1 |
| 6,731,948 | B1 * | 5/2004 | Lee et al. | 455/522 |
| 6,754,497 | B1 * | 6/2004 | Ozluturk | 455/437 |
| 6,975,608 | B1 * | 12/2005 | Park et al. | 370/332 |
| 7,002,936 | B2 * | 2/2006 | Agrawal et al. | 370/329 |
| 7,031,278 | B2 * | 4/2006 | Agrawal et al. | 370/331 |
| 7,035,236 | B2 * | 4/2006 | Agrawal et al. | 370/331 |
| 7,039,028 | B2 * | 5/2006 | Chen et al. | 370/331 |
| 7,075,910 | B2 * | 7/2006 | Chen et al. | 370/331 |
| 7,151,756 | B1 * | 12/2006 | Park et al. | 370/331 |
| 7,376,120 | B2 * | 5/2008 | Miyawaki et al. | 370/350 |
| 7,433,386 | B2 | 10/2008 | Lucidarme et al. | |
| 2001/0004604 | A1 | 6/2001 | Toshimitsu et al. | 455/562 |
| 2001/0046879 | A1 | 11/2001 | Schramm et al. | |
| 2002/0045451 | A1 * | 4/2002 | Hwang et al. | 455/442 |
| 2002/0167926 | A1 | 11/2002 | Lee | |
| 2002/0193116 | A1 * | 12/2002 | Agrawal et al. | 455/445 |
| 2003/0058853 | A1 | 3/2003 | Gorbatov et al. | |
| 2004/0067774 | A1 * | 4/2004 | Masaoka et al. | 455/561 |
| 2004/0072325 | A1 | 4/2004 | Anazawa et al. | |
| 2004/0087343 | A1 | 5/2004 | Lucidarme et al. | |
| 2005/0096033 | A1 * | 5/2005 | Miyawaki et al. | 455/422.1 |
| 2007/0004415 | A1 * | 1/2007 | Abedi | 455/442 |
| 2007/0254717 | A1 * | 11/2007 | Yahagi | 455/562.1 |
| 2008/0102839 | A1 | 5/2008 | Kurokawa | |
| 2008/0153495 | A1 * | 6/2008 | Ogami et al. | 455/436 |
| 2008/0254802 | A1 * | 10/2008 | Ohta et al. | 455/440 |
| 2009/0185539 | A1 * | 7/2009 | Ohta et al. | 370/331 |
| 2009/0290555 | A1 | 11/2009 | Alpert et al. | |
| 2009/0291686 | A1 * | 11/2009 | Alpert et al. | 455/436 |
| 2010/0111037 | A1 | 5/2010 | Tanigawa et al. | |
| 2010/0142477 | A1 | 6/2010 | Yokota | |
| 2010/0232394 | A1 * | 9/2010 | Ohta et al. | 370/331 |

FOREIGN PATENT DOCUMENTS

| | | |
|---|---|---|
| EP | 1 968 330 | 9/2008 |
| JP | 11-308657 | 11/1999 |
| JP | 2004-282249 | 10/2004 |
| JP | 2004-531962 | 10/2004 |
| JP | 2005-117551 | 4/2005 |
| JP | 2005-184438 | 7/2005 |
| JP | 2010-183632 | 8/2010 |
| WO | 99/51052 | 10/1999 |
| WO | 2007/074515 | 7/2007 |

OTHER PUBLICATIONS

Supplementary European Search Report Aug. 9, 2010, from corresponding European Application No. 05 82 2376.
United States Office Action dated Apr. 19, 2011, from corresponding U.S. Appl. No. 12/144,847.
Chinese 2nd Notification of Office Action dated Jul. 20, 2012, from corresponding Chinese Application No. 201010507185.7.
United States Office Action dated Aug. 2, 2012, from corresponding U.S. Appl. No. 12/144,847.
Communication pursuant to Article 94(3) EPC dated May 4, 2012, from corresponding European Application No. 10 163 947.4-1525.
United States Office Action dated May 21, 2012, from corresponding U.S. Appl. No. 12/144,847.
United States Office Action dated Apr. 3, 2013, from corresponding U.S. Appl. No. 12/144,847.
Wikipedia. "Base Station Subsystem", printed Feb. 19, 2013.
Chinese 3rd Notification of Office Action dated Feb. 25, 2013, from corresponding Chinese Application No. 201010507185.7.
Notice of Allowance with References Cited dated Jul. 19, 2013, from corresponding U.S. Appl. No. 12/144,847.
Decision of Rejection dated Aug. 28, 2013, from corresponding Chinese Application No. 201010507185.7.
International Search Report dated Apr. 18, 2006, from the corresponding International Application.
H. Soliman, et al. "Hierarchical Mobile IPv6 Mobility Management (HMIPv6)" Network Working Group Request for Comments: 4140, Aug. 2005.
R. Koodli. "Fast Handovers for Mobile IPv6" Network Working Group Request for Comments: 4068, Jul. 2005.
Hideaki Takahashi, et al. "Transmission Quality Evaluation of Hierarchical Mobile IPv6 with Buffering Using Test Bed" VTC-2003 Spring, 2003.
Chinese Office Action dated Jun. 10, 2014 from corresponding Application No. 201010507185.7.

* cited by examiner

FIG. 7

(a) TRANSMISSION FROM A BASE STATION TO THE MOBILE CONTROL DEVICE

| TRANSMISSION SOURCE (BASE STATION ID) | | | TRANSMISSION DESTINATION (MOBILE CONTROL DEVICE ID) | | | | |
|---|---|---|---|---|---|---|---|
| ID | (1) | UNIT | ID | (2) | ID | (3) | ID | (4) |

(b) TRANSMISSION FROM THE MOBILE CONTROL DEVICE TO A BASE STATION

| TRANSMISSION SOURCE (MOBILE CONTROL DEVICE ID) | | | | TRANSMISSION DESTINATION (BASE STATION ID) | | | |
|---|---|---|---|---|---|---|---|
| ID | (1) | ID | (2) | ID | (3) | ID | (4) |

FIG. 8

(a) MESSAGE SENT TO BTS2

| 00001000 | 00000010 | 11 | 11 | 00 | 00 |
|---|---|---|---|---|---|

(b) MESSAGE SENT TO BTS3

| 00001000 | 00000011 | 11 | 11 | 00 | 00 |
|---|---|---|---|---|---|

(c) MESSAGE SENT TO BTS4

| 00001000 | 00000100 | 11 | 11 | 00 | 00 |
|---|---|---|---|---|---|

FIG. 9

(a) MESSAGE RECEIVED FROM BTS2

| 00000010 | 00001000 | 1 00000111 010 | 11 | 00 | 00 |
|---|---|---|---|---|---|

(b) MESSAGE RECEIVED FROM BTS3

| 00000011 | 00001000 | 1 00000111 010 | 11 | 00 | 00 |
|---|---|---|---|---|---|

(c) MESSAGE RECEIVED FROM BTS4

| 00000100 | 00001000 | 1 11000000 001 | 11 | 00 | 00 |
|---|---|---|---|---|---|

MOBILE CONTROL DEVICE AND HANDOVER CONTROL METHOD

BACKGROUND OF THE INVENTION

The present invention relates to a mobile control device and handover control method, and more particularly to a mobile control device and handover control method in a mobile communication system that performs handover control of switching base stations that communicate with a mobile terminal as that mobile terminal moves.

FIG. 30 is a drawing showing the construction of a mobile communication system that uses IP (Internet Protocol), and comprises a mobile control device MCA, radio communication base stations BTS1 to BTSn and a plurality of mobile terminal MS (only one is shown in the drawing). The mobile control device MCA is connected to the IP network, which is a wired network, as well as is connected to the plurality of base stations BTS1 to BTSn using wired connections. The base stations BTS1 to BTSn perform radio communication with mobile terminals MS that are within cells CL1 to CLn.

Packets that are sent from a terminal (not shown in the figure) to a mobile terminal MS are sent to the mobile control device MCA that accommodates that mobile terminal. When the mobile terminal MS is located within the cell CL1, the mobile control device MCA sends the packets to the base station BTS1 that accommodates that cell, and then the base station BTS1 sends the packets to the mobile terminal MS using radio communication. After that, as long as the mobile terminal MS is located with the cell CL1, the mobile control device MCA performs control so that the communication between the sending terminal and the mobile terminal MS is performed using the path described above. However, when the mobile terminal MS moves and moves into an adjacent cell CL2, the mobile control device MCA performs handover control to switch the relay base station from the base station BTS1 to the base station BTS2.

In this mobile communication that uses IP, it is feasible to apply a Mobile IP (RFC2002, RFC3775) that makes mobility control in IP layers possible. By applying this technology to a mobile network, it becomes possible to continue IP communication even though as shown in FIG. 30, the base station with which the mobile terminal MS is connected changes during communication. Adopting Mobile IP as the mobility control protocol in next-generation cellular type mobile communication is being studied. In next-generation cellular type mobile communication a larger volume of high-speed communication is required than in the current mainstream 3G system, so in order to make high-speed packet transmission possible, a system is essential in which Mobile IP is performed at high speed.

Mobile IP gives a framework that is related to signaling necessary for performing packet transmission, however, detailed specifications related to packet transmission control are not given. Therefore, in order to perform Mobile IP at high speed, (1) technology for reducing the delay due to signaling, and (2) a transmission method for transmitting packets at high speed are necessary.

Hierarchical Mobile IPv6 Mobility Management (HMIPv6) (refer to Network Working Group Request for Comments 4140 (RFC4140) "Hierarchical Mobile IPv6 Mobility Management (HMIPv6)") has been proposed as a method for accomplishing point (1) described above for performing Mobile IP at high speed. Moreover, Fast Handover for Mobile IPv6 (FHO) (refer to Network Working Group Request for Comments 4068 (RFC4068) "Fast Handovers for Mobile IPv6"), or a method of multicasting packets beforehand to a plurality of candidates as a target base station for communication with the mobile terminal (refer to Japanese patent application JP2004-282249A) have been proposed as methods related to point (2) described above. Furthermore, Hierarchical Mobile IPv6 with Buffering (HMIPv6-B) (refer to VTC-2003 Spring "Transmission Quality Evaluation for Hierarchical Mobile IPv6 with Buffering Using Test Bed") that expands HMIPv6 and comprises a method of controlling packet transmission has been proposed. However, these methods have problems as described below.

Problems with HMIPv6:

HMIP is a method with the aim of reducing signaling in Mobile IP. HMIP is effective in increasing the speed of packet transmission by reducing signaling, however, it does not propose transmission technology itself for increasing the transmission speed.

Problems with FHO:

FHO proposes packet transmission technology for increasing the speed of packet. More specifically, FHO is a method of transferring in advance, remaining packets from the source base station to the target base station during handover of the mobile terminal. However, in this method, it is presumed that the target base station is already known, so there is a problem in that packets cannot be transferred when the target base station is not decided.

Problems with HMIPv6-B:

HMIPv6-B is a method that has a buffering function for buffering packets in addition to the other functions of HMIPv6, and at the same time takes into consideration increasing packet transmission. The buffering function is performed by a mobile control device that manages a plurality of handover base station candidates. With this method, it becomes possible to perform handover with reduced signaling delay and less packet loss. However, there is a problem in that delay time due to packet buffering increases.

Problems with Multicasting:

Multicasting is a method of multicasting packets beforehand to a plurality of base stations BTS2 to BTS4 that are candidates for handover of the mobile terminal MS during handover as shown in FIG. 31.

FIG. 32 is a drawing showing an example of construction of a mobile control device MCA and base stations BTS1 to BTSn in order to explain multicasting. The mobile control device MCA comprises: a wired network interface unit (hereafter, interface will be indicated as I/F) 101a that performs interface control between it and the IP network; a base station I/F unit 101b that performs interface control between it and the base stations; a transmission data processing unit 101c that performs communication control of user packets and control packets; and a handover/multicast control unit 101d that performs handover and multicast control. The base stations BTS1 to BTSn have the same construction, and comprise: a mobile control device I/F unit 102a that performs interface control between it and the mobile control device MCA; a radio communication I/F unit 102b that performs interface between control between it and the mobile terminal MS; a transmission data processing unit 102c that performs communication control of user packets and control packets; and a handover control unit 102d that performs handover control. The mobile control device MCA is connected to each of the base station BTS1 to BTSn by a single cable for each base station, and can freely transmit and receive control packets and user packets to or from the base stations by way of control channels and data channels.

FIG. 33 is a drawing showing the detailed construction of a mobile control device MCA, where the emphasis is placed on communication in the download direction. In the transmission data processing unit 101c, a packet copy unit 111 copies an input packet and inputs it to a transmission buffer 112 and a multicast unit 113. The transmission buffer 112 temporarily stores the input packet and transmits it to the suitable base station I/F unit 101b, and when the multicast unit 113 is instructed by the handover/multicast control unit 101d to perform a multicast, copies the input packet and multicasts that packet to the handover base station candidates BTS2 to BTS4 by way of the transmission buffers 114a to 114c and base station I/F 101b. In the handover/multicast control unit 101d, a handover control unit 121 performs overall handover control, and a multicast control unit 122 executes multicast control during handover.

FIG. 34 is a drawing showing the main parts of the handover control sequence when multicasting is employed, and FIG. 35 is a flowchart showing the flow of processing by the handover/multicast control unit 101d.

The handover control unit 121 of the mobile control device MCA requests the mobile terminal MS to periodically measure and report the radio communication status while communicating with the base station BTS1. After receiving the request to measure and report the radio communication status, the mobile terminal MS measures the reception levels from all of the surrounding base stations BTS2 to BTSn and reports the results to the mobile control device MCA by way of the base station BTS1 that it is communicating with. After receiving this report, the handover control unit 121 makes reference to the reported signal levels and determines whether handover is necessary (steps 151 to 152), and when handover is necessary, decides a plurality of handover base stations whose signal levels exceed a threshold value as handover base station candidates (step 153), and notifies the multicast control unit 122 of those handover base station candidates. In FIG. 34, base stations BTS2, BTS3 and BTS4 are handover base station candidates.

After the handover base station candidates have been decided, the multicast control unit 122 checks whether the interface address, for example the MAC address (Media Access Control Address), of each of the candidate base stations is known, and when the MAC address is not known, sends a MAC address search packet to acquire the interface address of the base station in question. After this process is completed, the multicast control unit 122 sends a multicast instruction to the multicast unit 113. By doing so, the multicast unit 113 copies the packets and multicasts the packets to the handover base station candidates BTS2, BTS3 and BTS4 (step 154).

At the same time as the multicast described above, the handover control unit 121 determines a handover base station (step 155). For example, when the strength of the received electrical field from the base station BTS2 becomes a set value or greater, the handover control unit 121 decides the base station BTS2 as a handover base station (referred to as target base station). Next, the handover control unit 121 requests the target base station BTS2 to set a radio communication channel (step 156). Moreover, after receiving a radio communication channel setting response from the target base station BTS2 (step 157), the handover control unit 121 instructs the target base station BTS2 to send the multicast packets to the mobile terminal MS, and performs control so that packets received from the IP network are sent to the mobile terminal MS by way of the target base station BTS2. Furthermore, the multicast control unit 122 stops the multicast, and instructs the handover base station candidates that were not selected as the target handover base station to delete the multicast packets, and performs the process to end handover (step 158).

FIG. 36 is a drawing that explains the main parts of a different handover control sequence. In this example as well, the mobile terminal MS is communicating with the current base station BTS1, and base stations BTS2 to BTSn are located around the base station BTS1. By making reference to the reception levels of the surrounding base stations that are reported by the mobile terminal MS according to the same sequence as shown in FIG. 34, the mobile control device MCA decides handover base station candidates. In the example sequence shown in FIG. 34, the signal levels are reported by way of the base station (source base station) BTS1, however, in this example, the signal levels are reported by way of each of the base stations. In this case, when each of the base stations reports its signal level to the mobile control device MCA, it also notifies the mobile control device of its MAC address. Therefore, this sequence differs from the sequence shown in FIG. 34 in that the mobile control device MCA does not need to inquire of the interface addresses of the base stations, and by deciding the handover base station candidates the mobile control device MCA can perform multicasting immediately.

By using the multicasting method described above, the mobile terminal MS is able to quickly receive data from the handover base station BTS2 after handover is complete, so high-speed handover becomes possible. This technique can be applied to a mobile network that uses Mobile IP, so it is a powerful high-speed packet transmission method that is capable of improving the problems with the HMIPv6, FHO and HMIPv6-B methods.

However, in the conventional multicast method, the multicast transmission rate is decided according to the transmission rate of the source base station to which the mobile terminal MS is connected before handover. Therefore, when there are differences in communication capabilities among the plurality of handover base station candidates, for example, when the buffer sizes or radio communication access methods differ, a certain base station candidate is unable to store the multicast packets and thus the packets are deleted or rejected. As a result, a time delay occurs due to retransmission of the deleted packets, and thus there is a comprehensive possibility that high-speed handover will not be possible. FIG. 31 will be used to explain the deletion of packets in a conventional multicast in which the base station BTS1 was a source base station and packets are multicast to the handover base station candidates BTS2 to BTS3. The base stations BTS1 to BTS3 are base stations that conform to the IEEE802.11a standard (54 Mb/s Max.), and the base station BTS4 is a base station that conforms to the 3G standard (384 Kb/s Max.). In conventional multicast control, a single transmission rate of the multicast is determined based on the transmission rate of the base station BTS1, and the maximum transmission rate is 54 Mb/s.

The buffer capacity of each base station is designed so that the size corresponds to the transmission rate of the radio communication access method, so the buffer capacity of the handover base station candidate BTS4 is designed less than the buffer capacities of the handover base station candidates BTS1 to BTS3. Therefore, the transmission rate of 54 Mb/s of the packets that are multicast to the handover base station candidate BTS4 greatly exceeds the maximum transmission rate of 384 Kb/s that is allowed for a 3G base station, so it is impossible to store all the packets that are multicast in the buffer of the base station BTS4, and deleted since the buffer becomes full. In the case that the mobile terminal is handed over to the base station BTS4, the deleted packets must be transmitted again, and the delay time that occurs by retransmitting the packets makes it impossible to achieve high-speed handover.

This problem occurs not only in the case of handover between different types of systems as in the example described above, but also occurs in handover of identical systems. For example, this problem occurs in the source base station and target base station when there is a large difference with the signal level of the mobile terminal.

To sum up, during handover of the mobile terminal, when the mobile control device performs multicasting at a single transmission rate without taking into consideration the performance of the plurality of handover base station candidates, packets may be deleted in the plurality of handover base station candidates that are under the control of the mobile control device due to an overflow from the buffer, and the following problems occur.

First, when packets are deleted due to the overflow from the buffer, the deleted packets must be retransmitted at the end-to-end level, and thus there is a problem in that the transmission delay of the packets increases. Therefore, high-speed handover becomes impossible.

In addition, in the base station BTS4, due to the multicast packets, the resources that could be used by other mobile terminals are decreased, so there is a problem in that the performance of those terminals is hindered, as well as there is a problem in that it is not possible for a mobile terminal to begin new communication.

SUMMARY OF THE INVENTION

Taking into consideration the problems described above, it is the object of the present invention to provide a mobile control device and handover control method that perform handover in a way such that packets that are multicast during handover control are not deleted by the handover base station candidates due to overflow from a buffer.

Another object of the present invention is to provide a mobile control device and handover control method that take into consideration the communication capability (buffer capacity, usage status of radio communication resources, and communication quality (Quality of Service)) of each of the base stations when deciding the transmission rate of packets that are multicast and sent to the base stations.

The present invention relates to a mobile control device and a handover control method in a mobile communication system that performs handover control by changing base stations that communicate with a mobile terminal as the mobile terminal moves.

Handover Control Method

The handover control method of the present invention comprises: a first step of selecting one or more handover base station candidates based on the communication state; a second step of deciding a multicast transmission rate for multicasting communication data based on the communication capabilities of each of the handover base station candidates; a third step of multicasting communication data to each of the handover base station candidates at the decided multicast transmission rate; and a fourth step of communication data that has been multicast and saved from a handover base station candidate that has been decided as a handover base station to the mobile terminal.

In the second step, the communication capability is buffer capacity of each of the handover base station candidates, and the multicast transmission rate for transmitting communication data is decided separately for each of the handover base station candidates based on the respective buffer capacity, or the minimum transmission rate of the handover base station candidates is decided as a common multicast transmission rate.

In the second step, the communication capability is availability state of radio communication resources of each of the handover base station candidates, and the multicast transmission rate for transmitting communication data is decided separately for each of the handover base station candidates based on the availability state of the respective radio communication resource.

In the second step, the communication capability is level of QoS (quality of service) that is executable by each of the handover base station candidates, and the multicast transmission rate for transmitting communication data is decided separately for each of the handover base station candidates based on the respective level of the executable QoS.

In the third step, the handover control method detects change in the communication capability of a handover base station candidate during multicasting; and based on the communication capability after change, adaptively changes the multicast transmission rate to the handover base station candidate, or removes the handover base station candidate as a multicast destination and stops the multicast to that handover base station candidate.

Mobile Control Device

The mobile control device of the present invention comprises: a handover base station candidate decision unit that selects one or more handover base station candidates based on the communication state; a transmission rate decision unit that decides a transmission rate for multicasting communication data based on the communication capabilities of each of the handover base station candidates; a multicast unit that transmits the communication data to each of the handover base station candidates at the decided multicast transmission rate; and a handover base station decision unit that decides one of the plurality of handover base station candidates as a handover base station.

Each of the handover base station candidates saves the multicast data, and the handover base station candidate that is set as the handover base station sends the saved communication data to the mobile terminal.

The transmission rate decision unit regards buffer capacity of each handover base station candidate as the communication capability, and based on the buffer capacity, decides a transmission rate for multicasting communication data separately for each handover base station candidate, or decides the minimum transmission rate among the handover base station candidates as a common multicast transmission rate.

The transmission rate decision unit regards availability state of radio communication resources of each handover base station candidate as the communication capability, and based on the availability state of the radio communication resource, decides a transmission rate for multicasting communication data separately for each handover base station candidate.

The transmission rate decision unit regards level of QoS (quality of service) that is executable by each handover base station candidate as the communication capability, and based on the level of the executable QoS, decides a transmission rate for multicasting communication data separately for each handover base station candidate.

The multicast unit comprises a transmission rate adjustment unit that multicasts communication data to each of the handover base station candidates at the decided transmission rate; and the transmission rate adjustment unit comprises a buffer that saves data of which quantity corresponds to the difference between the speed that communication data is input from the network and the speed at which data is multicast separately for each handover base station candidate.

When a change in the communication capability of a handover base station candidate is detected during multicasting, the transmission rate decision unit, based on the communication capability after change, adaptively changes the multicast transmission rate to the handover base station candidate, or removes the handover base station candidate as a multicast destination and stops the multicast to that handover base station candidate.

BRIEF DESCRIPTION OF THE DRAWINGS

FIG. 7 is a drawing showing an example of a message format.

FIG. 8 is a drawing showing an example of expressing the message of Table 1 in the format shown in FIG. 7.

FIG. 9 is a drawing showing an example of expressing the message of Table 2 in the format shown in FIG. 7.

DESCRIPTION OF THE PREFERRED EMBODIMENTS (A) First Embodiment (a) Construction of Communication System FIG. 1 shows an example of construction of a communication system for explaining the present invention, and shows a mobile control device MCA, radio communication base stations BTS1 to BTS5, and a plurality of mobile terminal MS (only one is shown in the figure). The mobile control device MCA is connected to an IP network, as well as is connected to a plurality of base stations BTS1 to BTSn so that it controls these base stations by way of a wired connection, and the base stations BTS1 to BTSn communicate through radio communication with mobile terminals MS that are located within cells CL1 to CLn.

A mobile terminal MS is located within the cell of the base station BTS1, and due to the movement of the mobile terminal, the base stations BTS2 to BTS4 are selected as handover base station candidates for that mobile terminal, and the mobile control device performs a multicast of a packet to these base stations. In FIG. 1, the base station BTS1 is a base station that conforms to the IEEE802.11a standard (54 Mb/s), the base stations BTS2 and BTS3 are base stations that conform to the HSDPA (3 GPP High Speed Downlink Packet Access) standard (maximum transmission rate: 14.4 Mb/s), and the base station BTS4 is a base station that conforms to the 3GPP standard (maximum transmission rate: 384 Kb/s).

(b) Mobile Control Device

Figure 2:
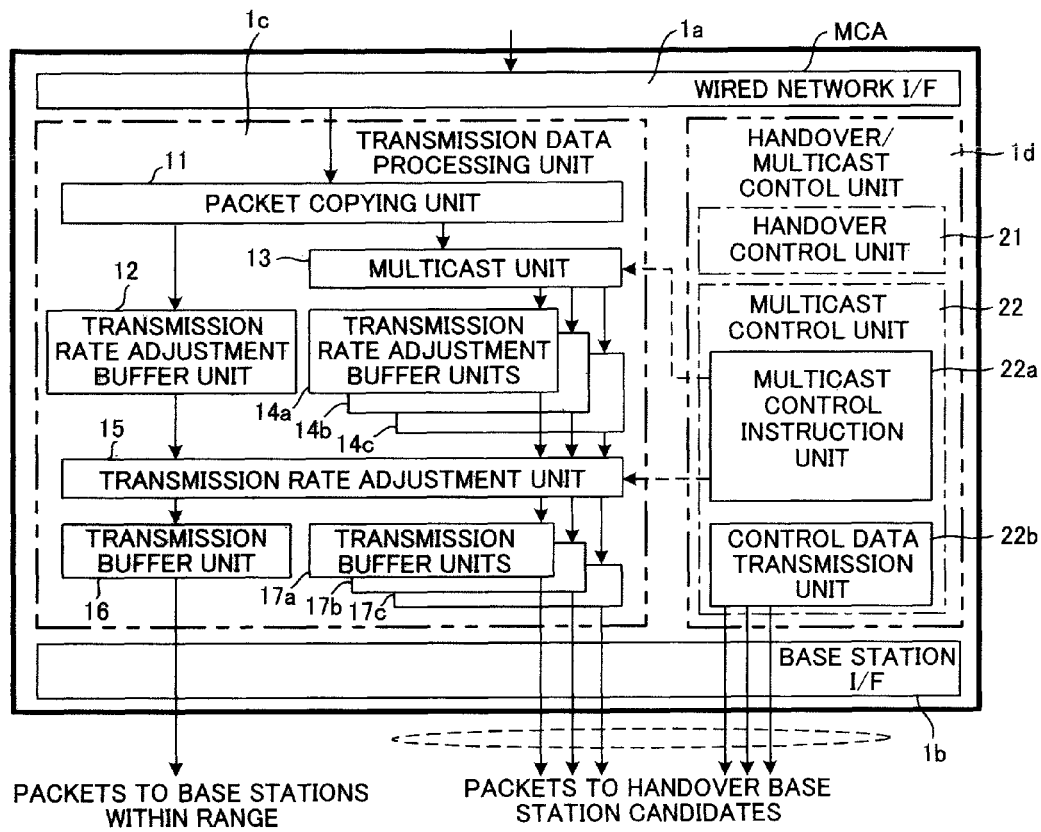
FIG. 2 is a drawing showing the construction of a mobile control device.

As shown in FIG. 2, the mobile control device MCA comprises: a wired I/F unit $1a$ that performs interface control between the mobile control device and a wired network (IP network); a base station I/F unit $1b$ that performs interface control between the mobile control device and the base stations; a transmission data processing unit $1c$ that performs communication control of user packets and control packets; and a handover/multicast control unit $1d$ that performs handover and multicast control.

In the transmission data processing unit $1c$, a packet copying unit 11 copies input packets and inputs the packets to a transmission rate adjustment buffer unit 12 and multicast unit 13. After receiving a multicast instruction from the handover/multicast control unit $1d$, the multicast unit 13 copies the input packets and stores the copied packets in transmission rate adjustment buffer units 14a to 14c. The transmission rate adjustment buffer units 12, 14a to 14c adjust the difference between the input rate and output rate of the packets. There is a possibility that the multicast transmission rates will differ for each of the handover base station candidates, so it is preferable that there is a transmission rate adjustment buffer unit 14a to 14c in the mobility control device MCA for each handover base station candidate.

Based on a multicast transmission rate that is instructed by the handover/multicast control unit 1d during handover, the transmission rate adjustment unit 15 reads the packets that are stored in the transmission rate adjustment buffer units 12, 14a to 14c, and inputs the packets to transmission buffer units 16, 17a to 17c. The transmission buffer unit 16 transmits the packets by way of the base station I/F unit 1b to the base station BTS1 that is currently communicating with the mobile terminal, and the transmission buffers 17a to 17c, temporarily store the input packets, and then by way of the appropriate base station I/F unit 1b, multicasts the packets to the handover base station candidates BTS2 to BTS4.

Normally, packets from the IP network are transmitted to the base station BTS1 that is currently communicating with the mobile terminal MS along the path from the wired network I/F unit 1a to the base station I/F unit 1b via the packet copying unit 11, the transmission rate adjustment buffer unit 12, the transmission rate adjustment unit 15 and the transmission buffer 16, without the transmission rate being adjusted. On the other hand, during multicasting in handover control, packets from the IP network are copied by the multicast unit 13 and then the copied packets are multicast to the handover base station candidates BTS2 to BTS3 along the path from the transmission rate adjustment buffer units 14a to 14c to the base station I/F unit 1b via the transmission rate adjustment unit 15 and the transmission buffers 17a to 17c.

In the handover/multicast control unit 1d, a handover control unit 21 performs overall handover control, and a multicast control unit 22 comprises a multicast control instruction unit 22a and control data transmission unit 22b. The multicast control instruction unit 22a notifies the multicast unit 13 of the handover base station candidates BTS2 to BTS4, and instructs the multicast unit 13 to perform a multicast, and based on the communication capabilities of the handover base station candidates BTS2 to BTS4, decides a multicast transmission rate and inputs that transmission rate to the transmission rate adjustment unit 15. The control data transmission unit 22b acquires and stores data related to the communication capability of each of the base stations from control packets that are sent from each of the handover base station candidates BTS2 to BTS4.

(c) Base Station

Figure 3:
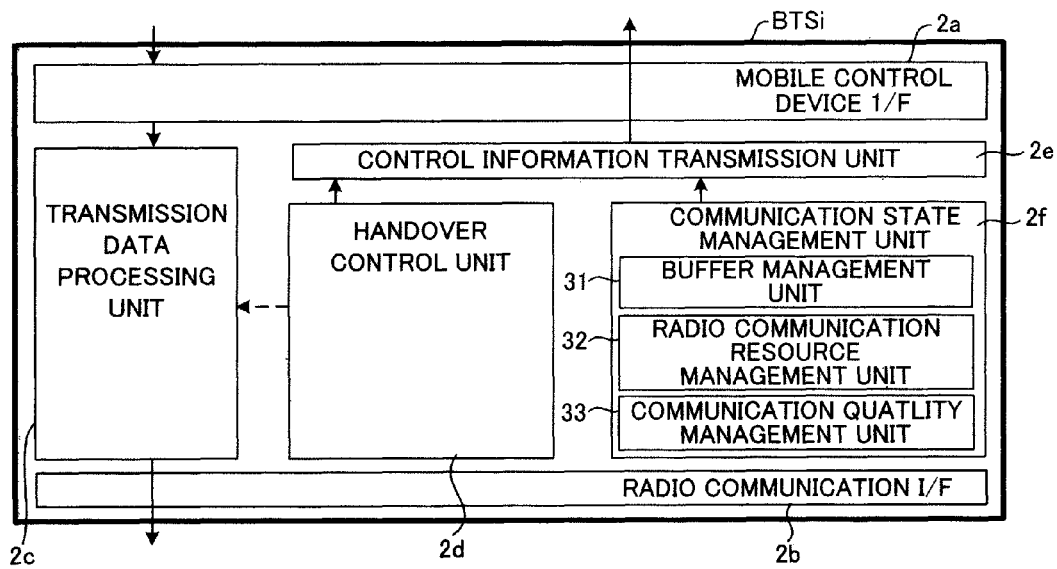
FIG. 3 is a drawing showing the construction of a base station device.

FIG. 3 shows the construction of the base stations BTS1 to BTSn, where each of the base stations has the same construction. A base station comprises: a mobile control device I/F unit 2a that perform interface control between the base station and the mobile control device MCA; a radio communication I/F unit 2b that performs interface control between the base station and the mobile terminal MS; a transmission data processing unit 2c that performs communication control of user packets and control packets; a handover control unit 2d that performs handover control; a control information transmission unit 2e that transmits control packets to the mobile control device MCA; and a communication state management unit 2f. The communication state management unit 2f is the part that manages the state that indicates the communication capability of the base station, and comprises: a buffer management unit 31 that manages the buffer capacity; a radio communication resource management unit 32 that manages the state of the radio communication resources (use state of the channel, bandwidth, etc.); and a communication quality management unit 33 that manages the level of the executable communication quality (QoS). The mobile control device MCA is connected with each of the base stations BTS1 to BTSn by a cable for each base station, and is capable of freely sending and receiving control packets and user packets to and from each of the base stations over a data channel.

(d) Handover Control Sequence

Figure 4:
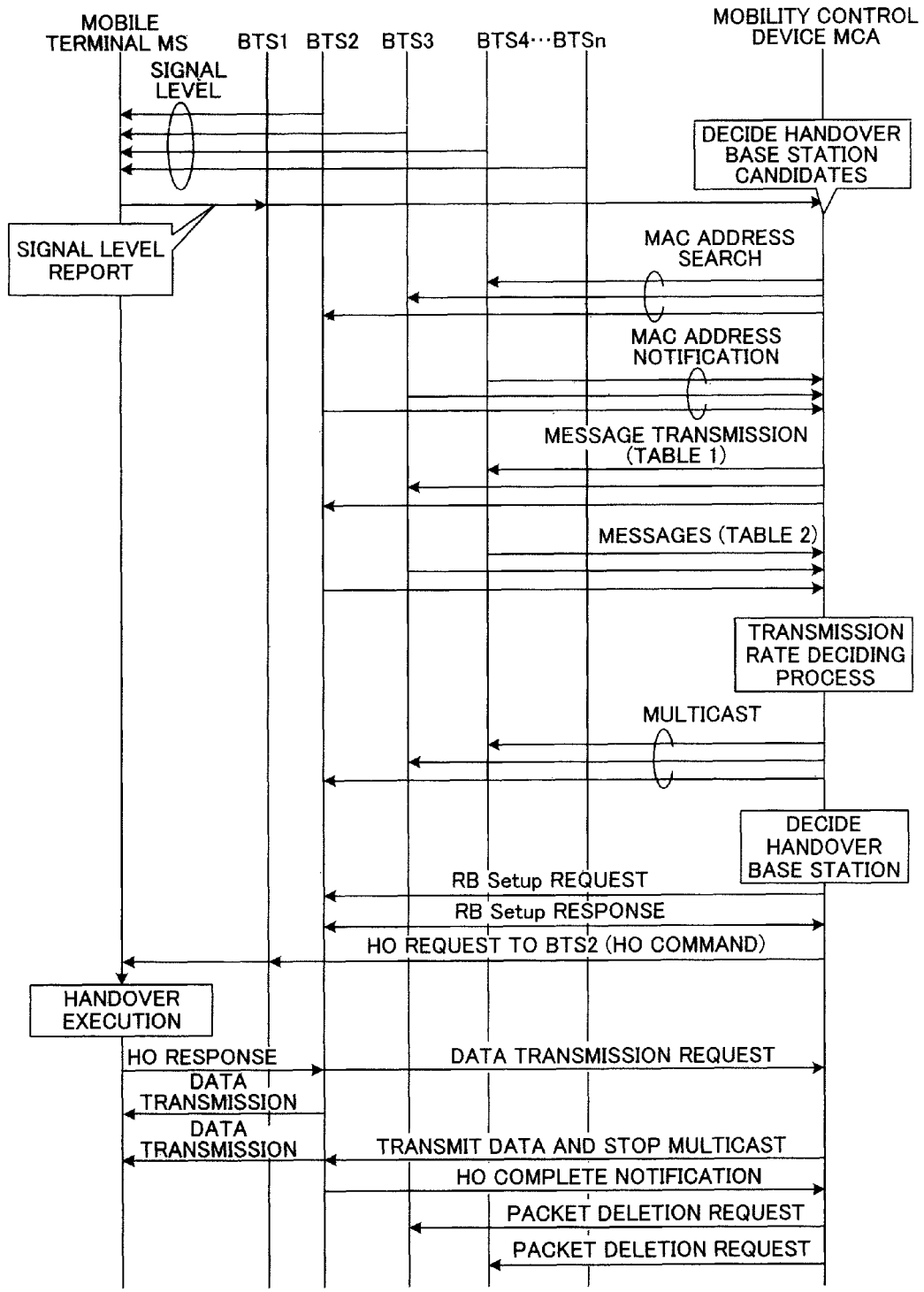
FIG. 4 is a drawing showing a handover control sequence of the present invention.

FIG. 4 shows a handover control sequence of the present invention.

Figure 1:
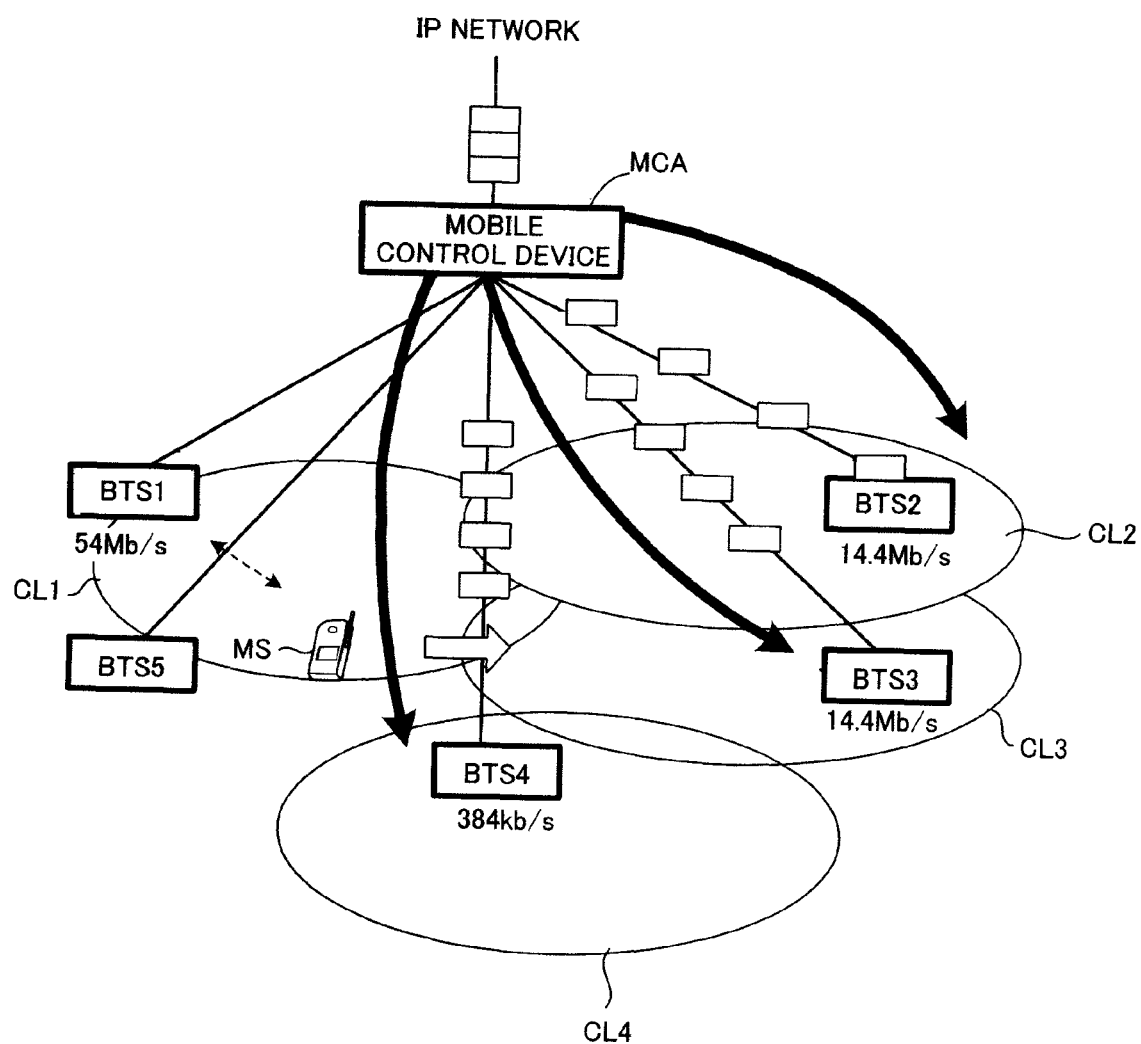
FIG. 1 is a drawing showing an example of construction of a communication system for explaining the present invention.

While the mobile terminal MS is communicating with the base station BTS1 (see FIG. 1), the handover control unit 21 of the mobile control device MCA requests the mobile terminal MS to per measure and report the radio communication status. After receiving the request to measure and report the radio communication status, the mobile terminal MS measures the reception levels from the surrounding base stations BTS2 to BTSn, and reports the results to the mobile control device MCA by way of the base station BTS1 with which it is communicating.

After receiving this report, the handover control unit 21 makes reference to the reported signal levels and determines whether handover is necessary, and when handover is necessary, decides one or more of the base stations whose signal levels exceed a threshold value as handover base station candidates, and notifies the multicast control unit 22 of the handover base station candidates. In FIG. 4, the base stations BTS2, BTS3 and BTS4 are the handover base station candidates.

After the handover base station candidates have been decided, the multicast instruction unit 22a of the multicast control unit 22 checks whether the MAC address of each of the base stations is known, and when a MAC address is not known, acquires the interface addresses of the base stations whose MAC addresses are unknown by sending a MAC address search packet. After this procedure has finished, the multicast control instruction unit 22a controls the control data transmission unit 22b and performs control of acquiring information that indicates the communication capabilities of the handover base station candidates BTS2 to BTS4 from a message transmission. The acquired information that indicates the communication capability is used for deciding the multicast transmission rate.

There are the following states that indicate the communication capability of a base station:
(1) Maintainable buffer capacity;
(2) Availability state of radio communication resources;
(3) Possibility of the QoS which mobile terminal desired.
Therefore, the control data transmission unit 22b sends control packets for checking each of the aforementioned states to each of the handover base station candidates BTS2 to BTS4. By reference to the reports from the base stations in response to the control packets for checking the communication capability, the multicast control instruction unit 22a becomes aware of the communication capabilities of each of the handover base station candidates BTS2 to BTS4, and decides a multicast transmission rate that corresponds to the communication capability.

The communication capability check message that is sent by the control data transmission unit 22b, and the communication capability report message that is sent by a base station are expressed as shown in Table 1 and Table 2. Table 1 shows a case where the base station is not requested to check whether or not it is capable of maintaining QoS.

TABLE 1

Control Message Sent By The Mobile control device
(X: There is no check request.)

|  |  | BTS2 | BTS3 | BTS4 | BTS5 |
|---|---|---|---|---|---|
| (1) | Buffer capacity | ○ | ○ | ○ | X |
| (2) | Availability state of resource | ○ | ○ | ○ | X |
| (3) | Possibility of QoS | X | X | X | X |

TABLE 2

Communication Capability Report Message
Sent By The Base Station

|  |  | BTS2 | BTS3 | BTS4 | BTS5 |
|---|---|---|---|---|---|
| (1) | Buffer capacity | 7 Mb | 7 Mb | 192 Kb | X |
| (2) | Availability state of resource | 1 | 1 | 1 | X |
| (3) | Possibility of QoS | X | X | X | X |

The reason that the base station is not requested to check the possibility of the QoS is that TCP (Transmission Control Protocol) is presumed to be used as the end-to-end data transmission protocol. Moreover, since the base station BTS5 is not a handover base station candidate, a check control packet is not sent to it. In Table 2, item (1) shows the buffer capacity that can actually be maintained. Supposing that the handover time is 500 ms, the buffer capacities of the base stations BTS2 to BTS4 are respectively 7 (=14.4×0.5) Mb, 7 Mb and 192 (=384×0.5) kb. In (2) of Table 2, a value of '0 ' means that it is not possible to maintain the radio communication resources, and a value of '1 ' means that it is possible to maintain the radio communication resources. Similarly, in (3) of Table 2, a value of '0 ' means that it is not possible to provide the QoS requested by the mobile terminal, and a value of '1 ' means that it is possible to provide the QoS requested by the mobile terminal.

After acquiring information from the above procedure that indicates the communication capabilities of all of the handover base station candidates BTS2 to BTS4, the multicast control instruction unit 22*a* uses that information to decide a multicast transmission rate.

Figure 5:
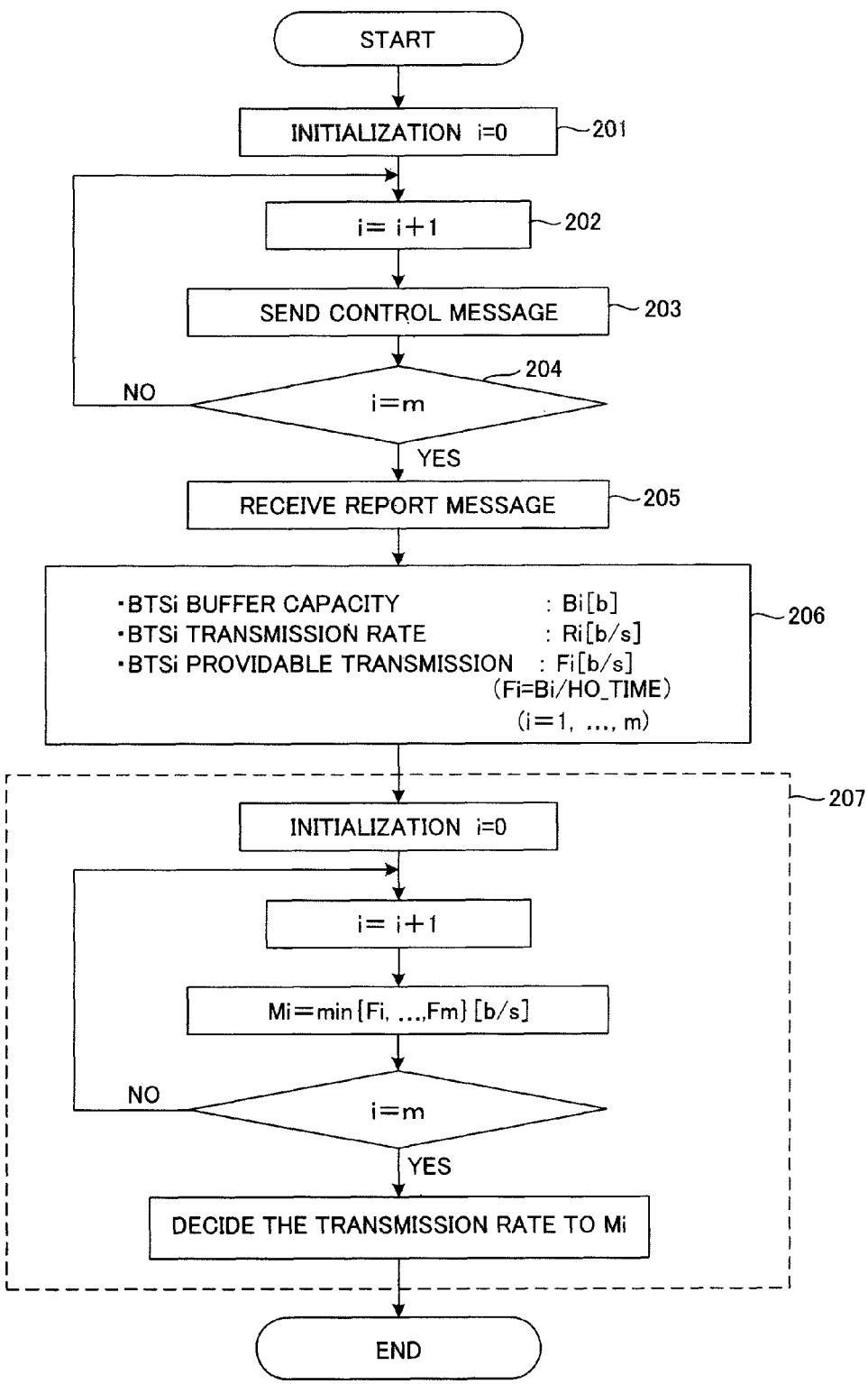
FIG. 5 is a flowchart of the process for deciding the transmission rate.

FIG. 5 is flowchart showing the flow of the process for deciding the transmission rate. The multicast control instruction unit 22*a* initializes 'i' to '0 ' (step 201), then increments 'i' by 1 and sends control messages to each of the handover base station candidates BTSi for checking the communication capability (steps 202 to 204), and receives report messages reporting the communication capabilities from each of the handover base station candidates BTSi (step 205). After receiving the buffer capacity Bi (bits) for the ith handover base station candidate BTSi from the control performed in steps 202 to 204, the multicast control instruction unit 22*a* calculates the transmission rate (providable transmission rate) Fi (b/s) that can be provided to the mobile terminal BTSi according to the following equation (step 206).

$Fi(b/s)=Bi/HO\text{-TIME}$

Here, HO-TIME is the handover time. Next, the multicast control instruction unit 22*a* finds the providable transmission rates Fi (b/s) (i =1, 2, . . . , m) for all of the handover base station candidates BTSi (i =1, 2 . . . , m), and of those rates, finds the minimum providable transmission rate Mi, and decides that minimum providable transmission rate Mi as the common multicast transmission rate for each of the handover base station candidates BTSi.

Figure 6:
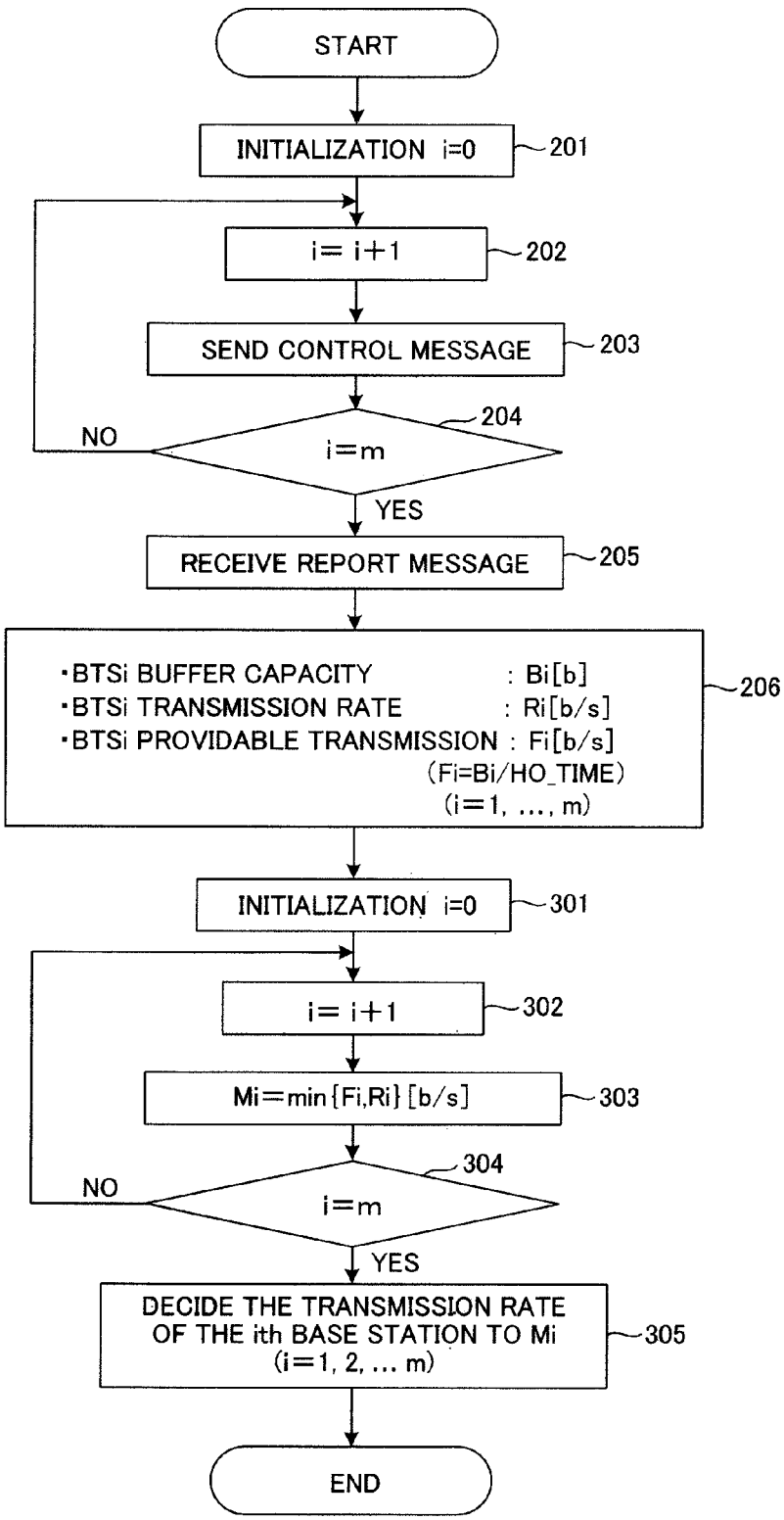
FIG. 6 is a flowchart of the process for calculating the multicast transmission rate for each individual handover base station candidate.

In FIG. 5, the common multicast transmission rate was found for all of the handover base station candidates BTSi in step 207, however, a multicast transmission rate can be calculated for each handover base station candidate BTSi individually. FIG. 6 is a flowchart showing the flow of the process for calculating a multicast transmission rate for each handover base station candidate BTSi individually, where Ri (b/s) is the maximum transmission rate possible for the handover base station candidate BTSi. Steps 201 to 206 are the same as in the flowchart shown in FIG. 5.

After finding the providable transmission rates Fi (b/s) for each of the handover base station candidates BTSi (i=1, 2, . . . m) in step 206, the multicast control instruction unit 22*a* initializes 'i' to '0 ' (step 301), and then increments i by 1 (step 302). After that, the multicast control instruction unit 22*a* finds the smaller transmission rate between the providable transmission rate Fi (b/s) for the handover base station candidate BTSi and the maximum transmission rate Ri (b/s) possible for the handover base station candidate BTSi, and sets it as Mi (step 303), then repeats this process for all of the handover base station candidates BTSi (i=1, 2, . . . , m) (step 304) and sets Mi (i=1, 2, . . . , m) as the multicast transmission rates for each of the handover base station candidates BTSi (step 305).

After the multicast transmission rate has been decides, the multicast control instruction unit 22*a* instructs the multicast unit 13 to perform a multicast, and inputs the multicast transmission rate to the transmission rate adjustment unit 15. By doing this, the multicast unit 13 copies the packets and input the copied packets to the transmission rate adjustment buffer units 14*a* to 14*c*. The multicast unit 13 attaches identifiers to the multicast packets in order to distinguish the packets to be multicast from normal packets.

The transmission rate adjustment unit 15 read packets from the transmission rate adjustment buffer units 14*a* to 14*c* based on the multicast transmission rate for each of the handover base station candidates BTS2, BTS3, BTS4, and multicasts the packets to each of the handover base station candidates BTS2, BTS3, BTS4 by way of the transmission buffer units 17*a* to 17*c* and base station I/F unit 1*b* (See FIG. 4).

At the same time as the multicast described above, the handover control unit 21 decides a handover base station. For example, when the strength of the electric field received from the base station BTS2 is equal to or greater than a set value, the handover control unit 21 decides that base station BTS2 as the handover base station. Next, the handover control unit 21 requests that handover base station BTS2 to set a radio communication bearer (RB Setup request). After receiving a radio communication bearer setting response (RB Setup response) from the base station BTS2, the handover control unit 21 sends a handover request (HO command) to the mobile terminal MS by way of the base station BTS1. By doing this, the mobile terminal MS executes handover from base station BTS1 to BTS2, and after handover has been executed, sends a handover response (HO response) to the base station BTS2.

In accordance to the handover response, the base station BTS2 sends the multicast packets that it has stored to the mobile terminal MS, and sends a data transmission request to the mobile control device MCA. In accordance to the data transmission request, the mobile control device MCA stops multicasting, and after that sends packets received from the IP network to the mobile terminal MS byway of the base station BTS2. By doing so, the base station BTS2 sends a handover complete notification to the mobile control device MCA, and the multicast control instruction unit 22a instructs the handover base station candidates BTS3 and BTS4 that were not selected as the handover base station to delete the multicast packets.

The instruction to delete the multicast packets is performed by sending the control messages shown in Table 3 to the handover base station candidates BTS3 and BTS4.

TABLE 3

Control Message Sent By The Mobile control device
(X: There is no check request.)

|  | BTS3 | BTS4 |
|---|---|---|
| (1) Buffer capacity | X | X |
| (2) Availability state of resource | X | X |
| (3) Possibility of QoS | X | X |
| (4) Packet deletion | 1 | 1 |

FIG. 7 shows examples of message formats, where (a) of FIG. 7 is an example of the format of a message from a base station BTSi to the mobile control device MCA, and (b) of FIG. 7 is an example of the format of a message from the mobile control device MCA to a base station BTSi.

In the message format, (1) to (4) are the message numbers, where (1) is the buffer capacity, (2) is the availability state of resource, (3) is the Possibility of the QoS desired by the mobile terminal, and (4) is packet deletion. The buffer capacity of message number (1) is expressed by 8 bits, and message numbers (2) to (4) are expressed by 1 bit. The base station IDs are expressed by 8 bits, and in order from base station BTS1 to BTS4 are: 00000001, 00000010, 00000011, 00000100, . . . . The ID of the mobile control device MCA is 00001000. The ID is expressed by 1 bit, and is '1 ' when referencing that field, and is '0 ' when not referencing that field. The units are expressed by 3 bits, where 100 is Gb/s, 010 is Mb/s and 001 is Kb/s.

FIG. 8 is an example that expresses the messages given in Table 1 in the format shown in FIG. 7, where (a) of FIG. 8 is a message from the mobile control device MCA to the base station BTS2 for checking the communication capability, (b) of FIG. 8 is a message from the mobile control device MCA to the base station BTS3 for checking the communication capability, and (c) of FIG. 8 is a message from the mobile control device MCA to the base station BTS4 for checking the communication capability.

FIG. 9 is an example that expresses the messages given in Table 2 in the format shown in FIG. 7, where (a) of FIG. 9 is a message from the base station BTS2 to the mobile control device MCA for reporting the communication capability, (b) of FIG. 9 is a message from the base station BTS3 to the mobile control device MCA for reporting the communication capability, and (c) of FIG. 9 is a message from the base station BTS4 to the mobile control device MCA for reporting the communication capability.

(e) Processing Flow of Handover Control

Figure 10:
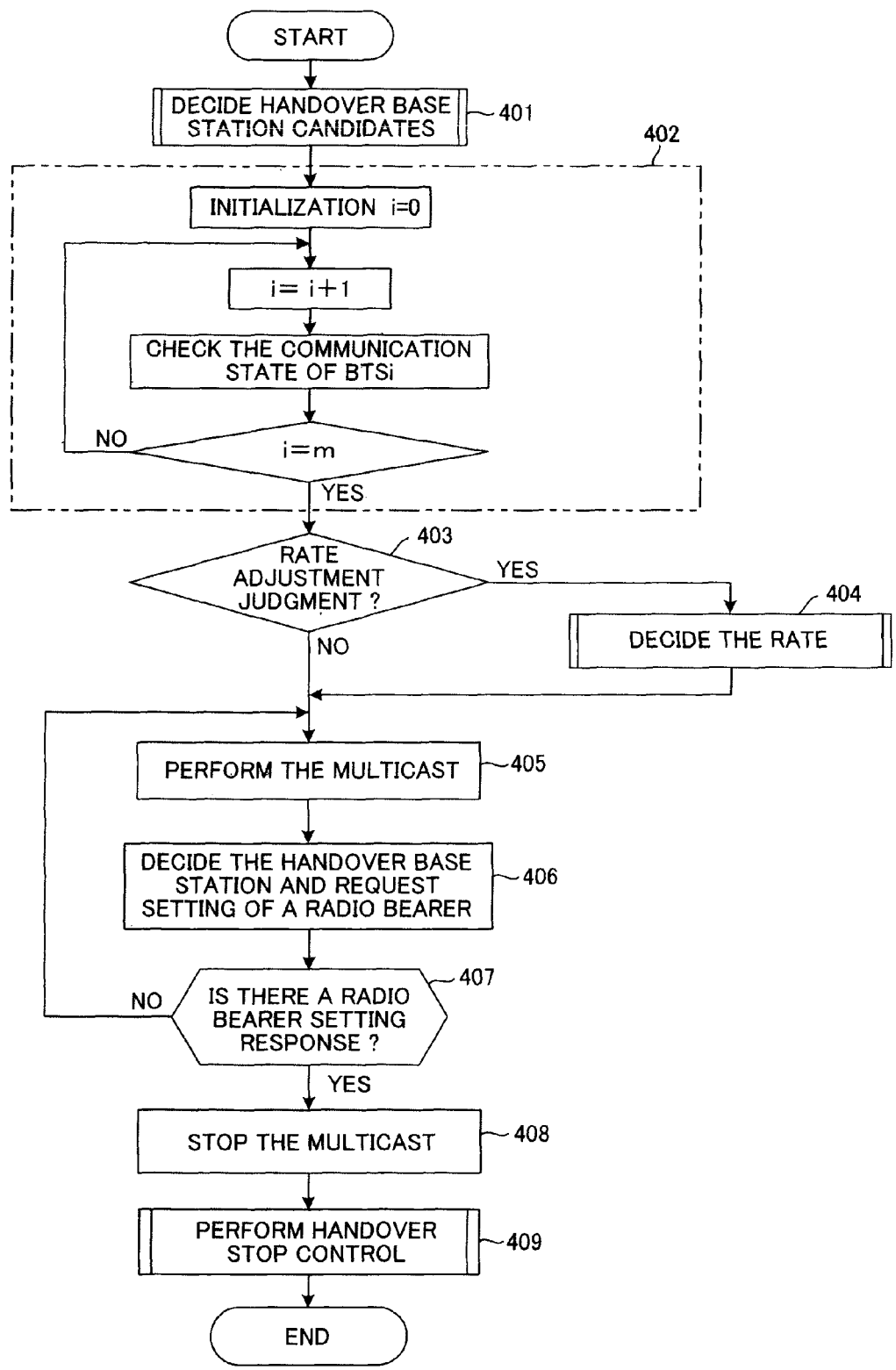
FIG. 10 is a flowchart showing the process for handover control by the handover/multicast control unit of the mobile control device.

FIG. 10 is a flowchart showing the flow of the handover control process by the handover/multicast control unit 1d of the mobile control device MCA.

The handover control unit 21 makes reference to the signal levels that are measured by the mobile terminal MS and determines whether handover is necessary, and when handover is necessary, decides base stations that correspond to signal levels that exceed a threshold value as handover base station candidates (step 401).

After the handover base station candidates have been decided, the multicast control unit 22 performs control by sending messages to acquire information that indicates the communication capabilities of the handover base station candidates BTS2 to BTS4 (step 402). After that, the multicast control unit determines whether it is necessary to adjust the multicast transmission rate (step 403), and when adjustment is necessary, decides the transmission rate according to the process shown in FIG. 5 or FIG. 6 (step 404), after which performs the multicast at that transmission rate (step 405).

At the same time that the multicast described above is being performed, the handover control unit 21 decides the handover base station and requests that handover base station (here that is base station BTS2) to set a radio bearer (step 406). After, reception of a radio bearing setting response from the base station BTS2 (step 407), the multicast control unit 22 stops the multicast and instructs the base station BTS2 to send the multicast packets to the mobile terminal MS (step 408). Next, the handover control unit 21 performs the process for ending handover (step 409). After that, the mobile control device MCA performs control so that packets received from the IP network are sent to the mobile terminal MS via the base station BTS2.

Figure 11:
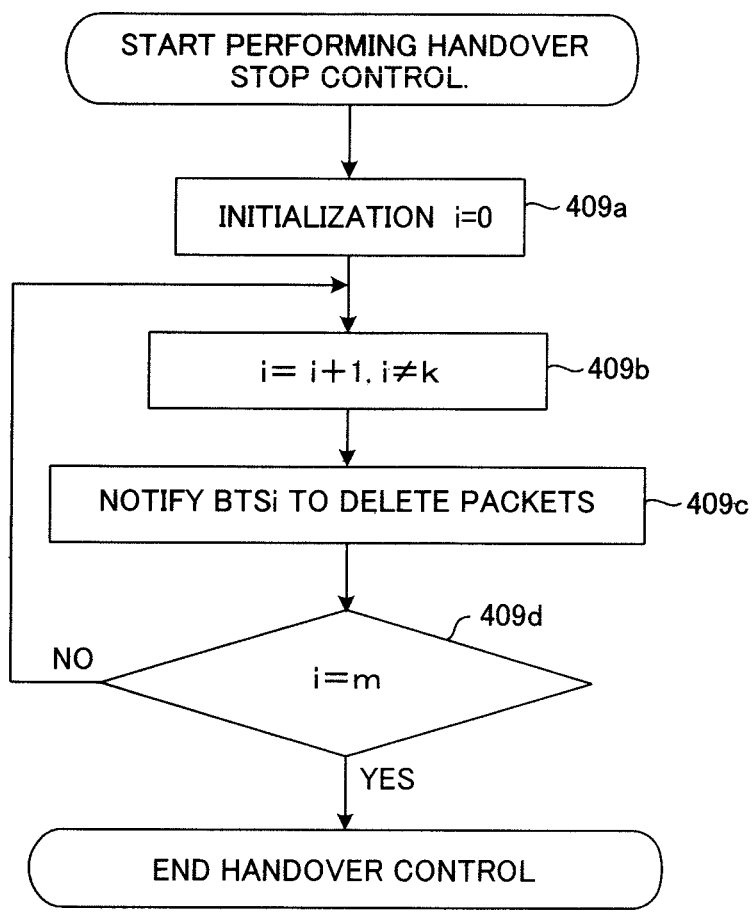
FIG. 11 is a drawing showing the control process for ending handover.

In the control to end handover in step 409, the handover control unit 21 instructs the handover base station candidates BTSi (i=1, 2, . . . , k−1, k+1, . . . , m), except for the base station BTSk that was selected to be the handover base station, to delete the multicast packets, as shown in steps 409a to 409d in FIG. 11. The handover base station candidates BTSi (i=1, 2, . . . , k−1, k+1, . . . , m), which were instructed to delete the multicast packets, delete packets to which the multicast packet identifier is attached.

Figure 12:
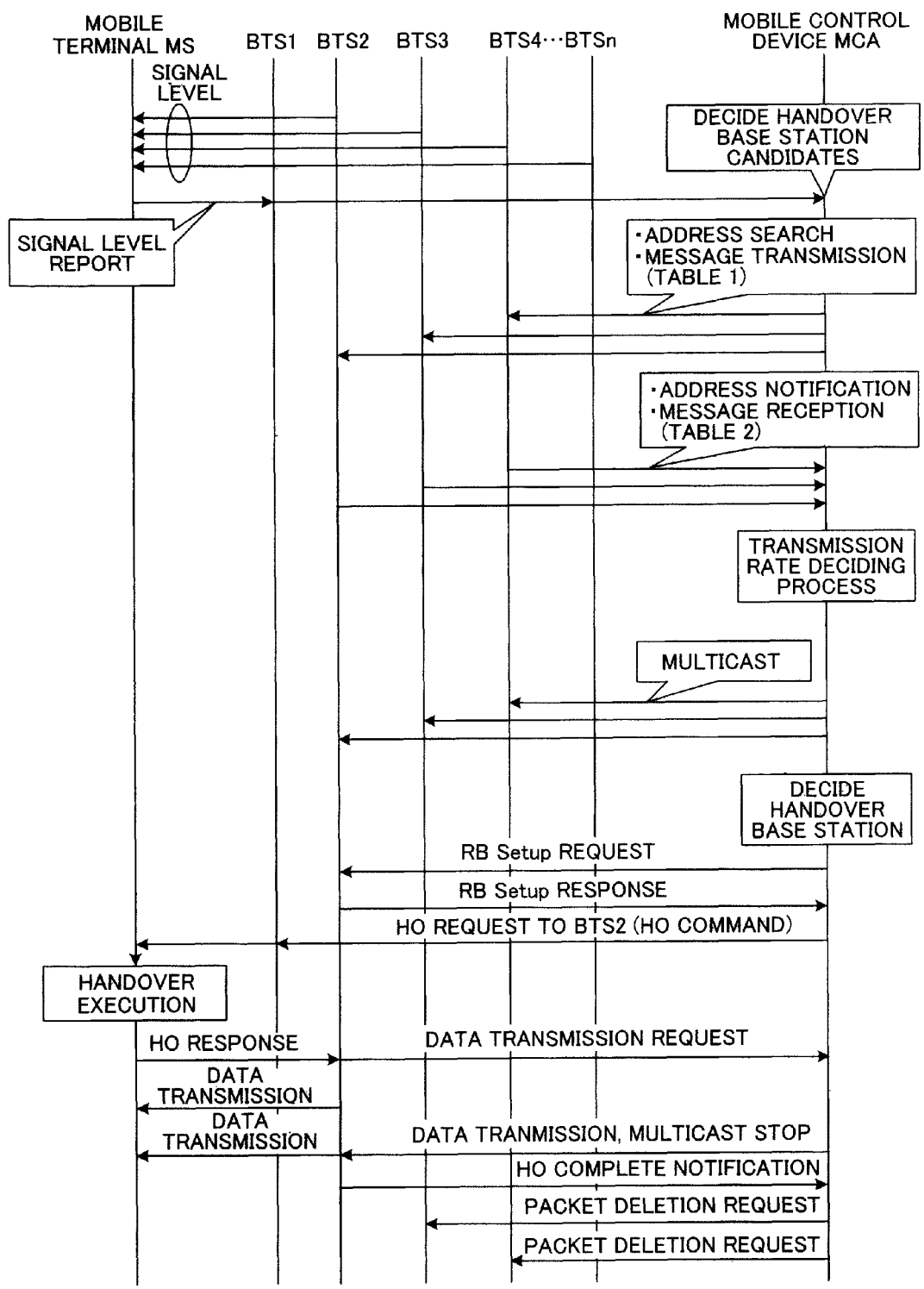
FIG. 12 is a drawing that explains another handover control sequence of the present invention.

FIG. 12 is a drawing for explaining a different handover control sequence of the present invention. In this sequence, the address search messages of the sequence shown in FIG. 4 are sent at the same time as the control messages for checking the communication capabilities (see Table 1), and address notification messages and communication capability notification messages (see Table 2) are received at the same time. By sending and receiving the two kinds of messages at the same time in this way, it is possible to reduce delays in sending and receiving messages.

(f) Effect of the First Embodiment

FIG. 13 to FIG. 16 are drawings for explaining the effect of the first embodiment. However, here the mobile terminal MS is handed over from the base station BTS1 to the base station BTS4.

Figure 13:
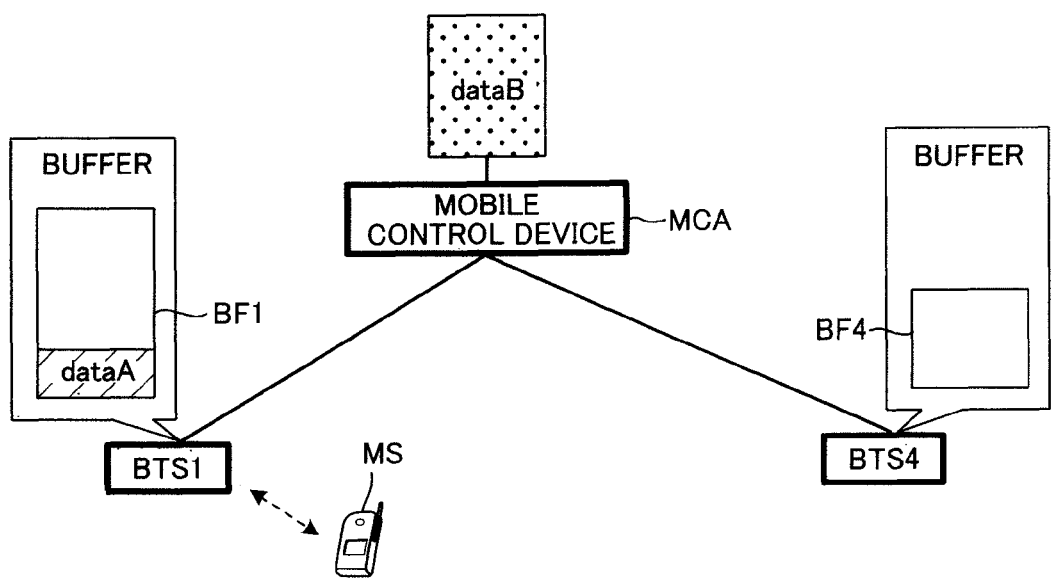
FIG. 13 is a drawing that explains the effect of a first embodiment of the invention.

As shown in FIG. 13, the transmission of data A to the source base station BTS1 is completed, and after that a handover is executed. So data B that is transmitted over the IP network to the mobile control device MCA must be multicast during the handover.

Figure 14:
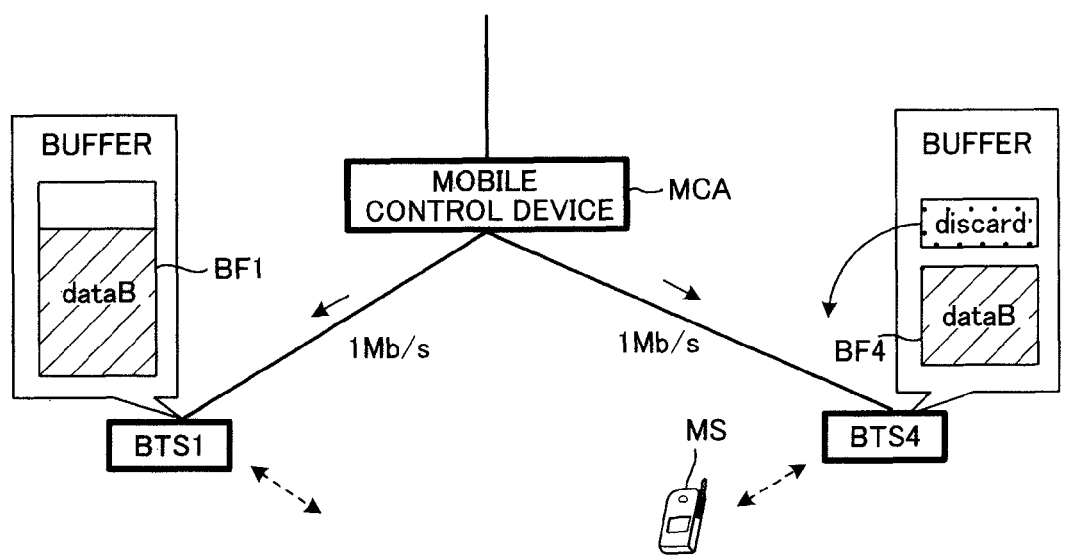
FIG. 14 is a drawing that explains the effect of a first embodiment of the invention.

When doing this, assuming that the mobile terminal MS performs TCP (Transmission Control Protocol) communication at an average throughput of 1 Mb/s, 500 Kb of data are transmitted during the handover time of 500 ms. Therefore, in order to avoid discarding packets during handover, it is necessary for the base station BTS4 to maintain a buffer capacity of at least 500 Kb. FIG. 14 is a drawing showing the state immediately after handover when using a conventional multicast method. In the conventional method, multicasting is performed at a transmission rate of 1 Mb/s, which is the transmission rate of TCP communication by the base station BTS1, so during the handover time of 500 ms, 500 Kb of data are multicast to the base station BTS4. However, the buffer BF4 of the base station BTS4 is only able to maintain a buffer capacity of 192 Kb maximum, so packets are discarded due to buffer overflow. The discarded packets are retransmitted by the TCP end-to-end retransmission control mechanism, so a delay occurs due to the retransmission.

Figure 15:
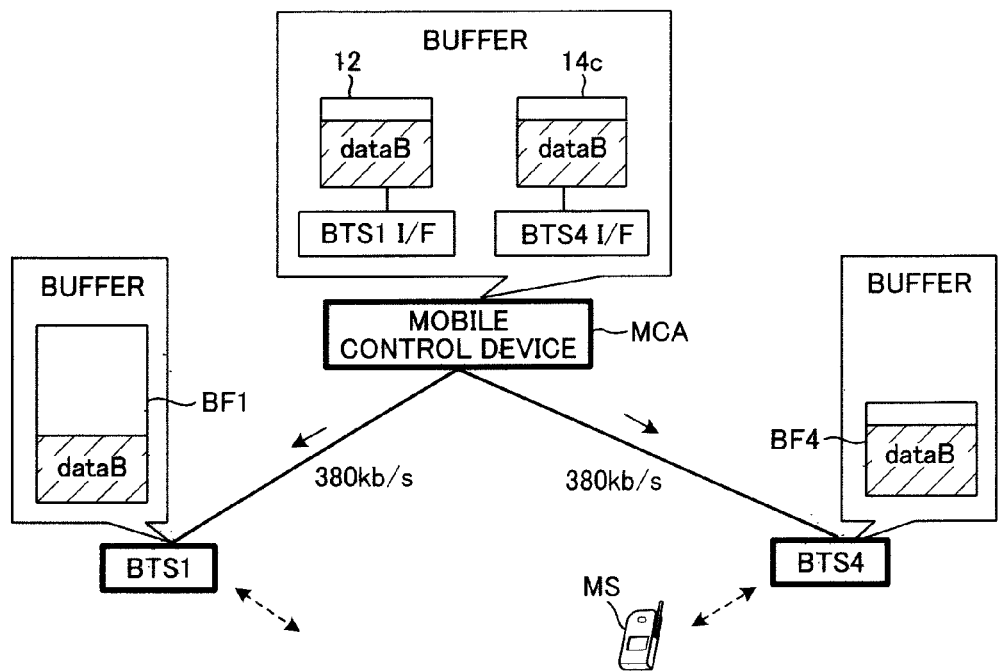
FIG. 15 is a drawing that explains the effect of a first embodiment of the invention.

However, with the first embodiment of this invention, the mobile control device MCA takes into consideration the buffer capacity (=192 Kb) of the buffer BF4 of the base station BTS4 when deciding the multicast transmission rate according to the processing flow shown in FIG. 5. For example, as shown in FIG. 15, the multicast transmission rate is decided to be 380 Kb/s. By deciding the multicast transmission rate in this way, 190 Kb of data is multicast to the base station BTS1 and base station BTS4 during the handover time of 500 ms, and the remaining data is stored in the transmission rate adjustment buffers 12, 14c of the mobile control device MCA. By performing this control, the discard of packets that occurred in the conventional method is avoided, and the mobile terminal MS is able to start TCP communication of packets immediately after handover. Therefore, it becomes possible to perform communication and avoid delays due to TCP retransmission control.

Figure 16:
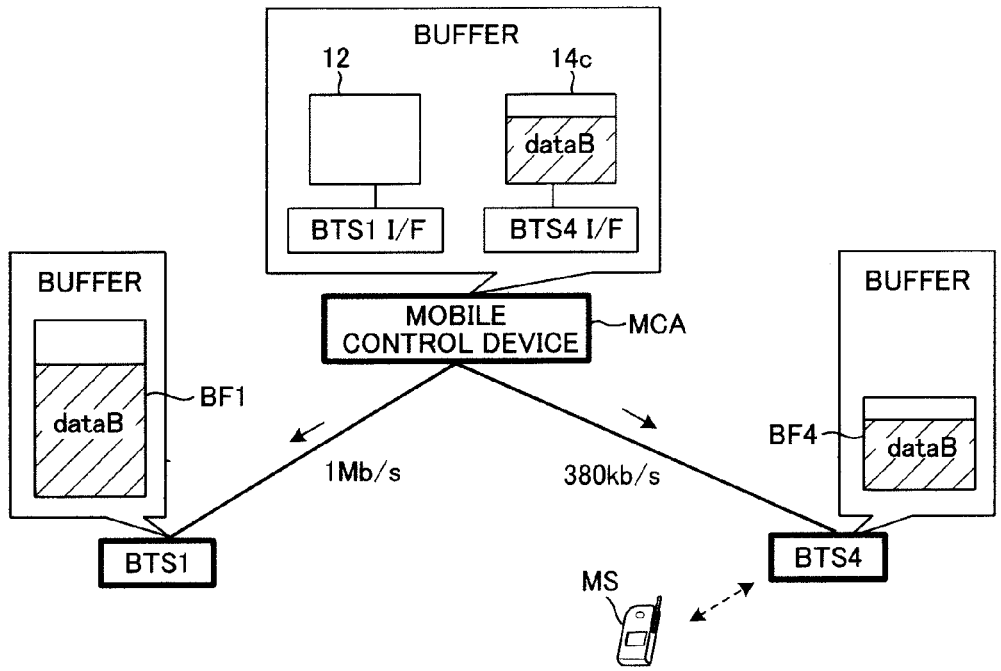
FIG. 16 is a drawing that explains the effect of a first embodiment of the invention.

Moreover, as shown in FIG. 16, by following the processing flow shown in FIG. 6, it is also possible to decide the transmission rates during multicasting for each of the base stations BTS1, BTS4 so they correspond with the communication capabilities (buffer capacities) of the base stations. For example, data is transmitted to the base station BTS1 at a rate of 1 Mb/s, and data is transmitted to the base station BTS4 at a rate of 380 Kb/s. By doing so, during the handover time of 500 ms, 500 Kb of data is transmitted to the base station BTS1, and 190 Kb of data is transmitted to the base station BTS4, and packets are not deleted due to buffer overflow. At this time, the remaining data is stored in the transmission rate adjustment buffer unit 14c of the base station BTS4.

(B) Second Embodiment (a) Overview

In the first embodiment, the mobile control device MCA was placed at a higher order than the base stations. However, in this second embodiment, the handover/multicast function is given to the base station that had performed communication up to that time.

Figure 17:
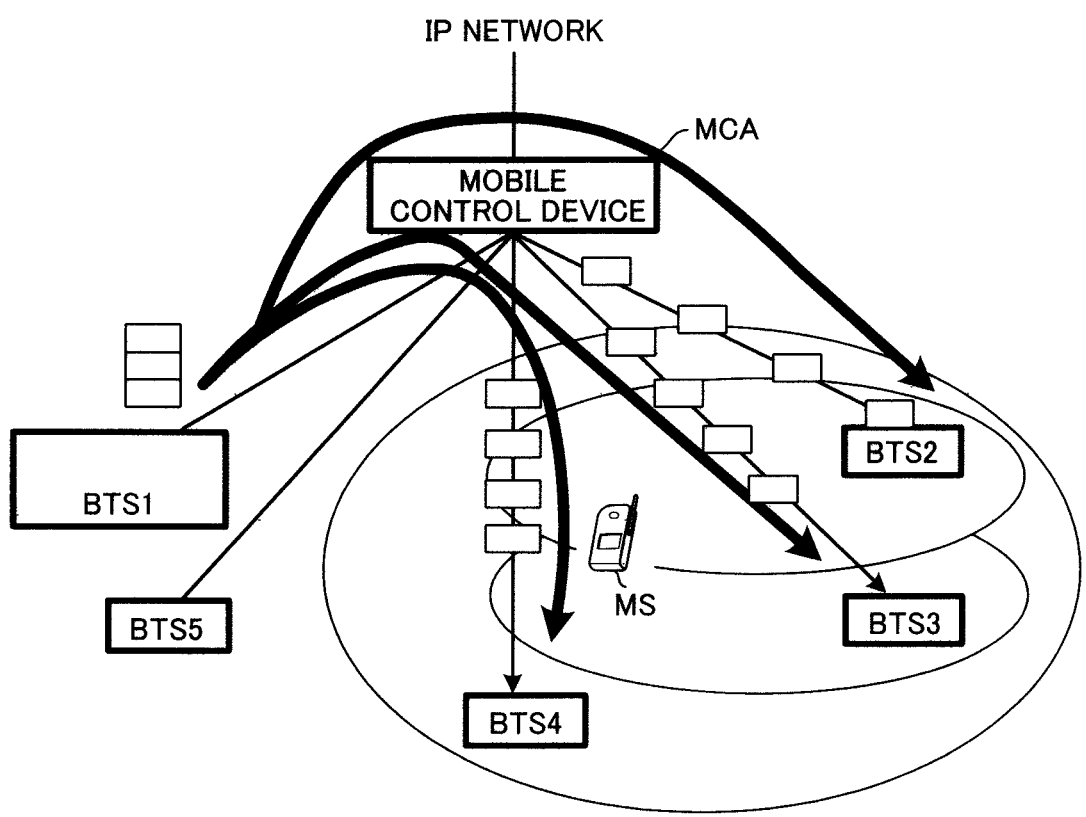
FIG. 17 is a drawing showing an example of the construction of a second embodiment of the invention.

FIG. 17 is a drawing showing the overall construction of this second embodiment, where the base station BTS1, which was in communication with the mobile terminal up until handover, performs the handover control and determines whether or not to perform handover, and when it is determined to perform handover, decides the handover base station candidates BTS2 to BTS4, and decides the multicast transmission rate based on the communication capabilities of each of the handover base station candidates BTS2 to BTS4, then multicasts packets to the handover base station candidates BTS2 to BTS4. At the same time as the multicast, the base station BTS1 also decides the handover base station, and make the handover base station (in this case base station BTS2) set a radio communication channel, after which the base station BTS1 stops the multicast and instructs the base station BTS2 to send the multicast packets to the mobile terminal MS. Next, the base station BTS1 instructs all of the handover base station candidates except base station BTS2 that was selected to be the handover base station to delete the multicast packets.

(b) Construction of the Base Stations

Figure 18:
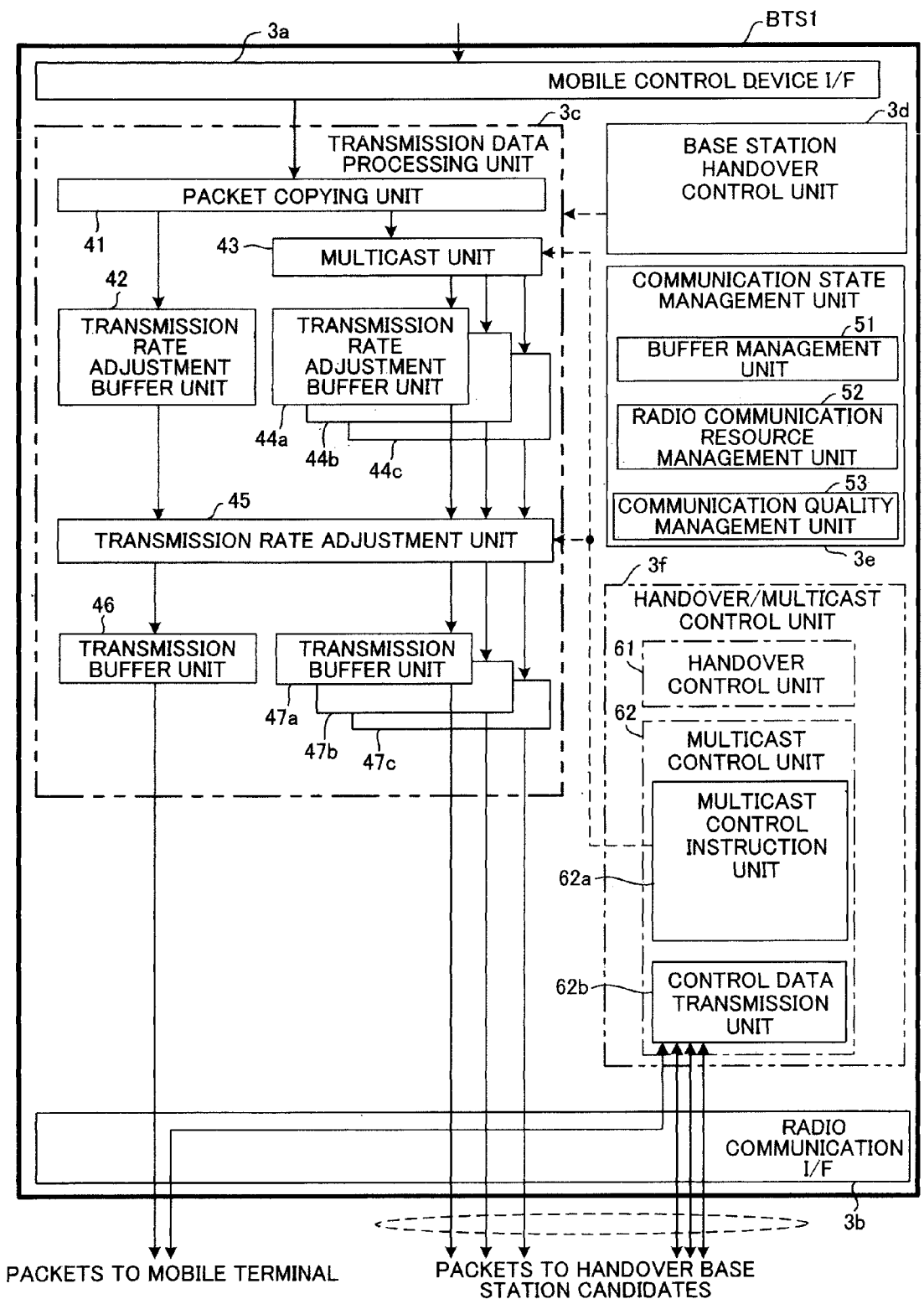
FIG. 18 is a drawing showing the construction of a base station that comprises a handover/multicast control function.

FIG. 18 is a drawing showing the construction of the base station BTS1 that comprises the handover/multicast control function as described above, and has the same construction as both the mobile control device and base station of the first embodiment as shown in FIG. 2 and FIG. 3. In other words, this base station BTS1 comprises: a mobile control device I/F unit 3a that performs interface control between it and the mobile control device MCA, a radio communication interface unit 3b that performs interface control between it and a mobile terminal MS, a transmission data processing unit 3c that controls communication of user packets and control packets, and performs multicasting of packets, a handover control unit 3d that performs handover control as a base station, a communication state management unit 3e that manages the state that indicates the communication capability as a base station, and a handover/multicast control unit 3f that performs handover and multicast control for the entire system.

In the transmission data processing unit 3c, a packet copying unit 41 copies packets that are input, and inputs the copies to a transmission rate adjustment buffer unit 42 and multicast unit 43. When instructed by the handover/multicast control unit 3f to perform a multicast, the multicast unit 43 copies the input packets and stores them in transmission rate adjustment buffer units 44a to 44c. The transmission rate adjustment buffer units 42, 44a to 44c adjust the difference between the input rate and output rate of the packets.

Based on a multicast transmission rate that is instructed by the handover/multicast control unit 3f during handover, a transmission rate adjustment unit 45 reads the packets that are stored in the transmission rate adjustment buffer units 42, 44a to 44c, and inputs the packets to transmission buffers 46, 47a to 47c. The transmission buffer 46 temporarily stores the input packets and sends the packets to the mobile terminal MS by way of the appropriate base station I/F unit 3b, and the transmission buffers 47a to 47c temporarily store the input packets and multicast them to the appropriate handover base station candidates BTS2 to BTS4.

The communication state management unit 3e is the part that manages the state that indicates the communication capability of the base station and comprises: a buffer management unit 51 that manages the buffer capacity, a radio communication resource management unit 52 that manages the availability state of radio communication resources (use state of channel, bandwidth, etc.), and a communication quality control unit 53 that manages the level of the executable communication quality (QoS).

In the handover/multicast control unit 3f, a handover control unit 61 controls the overall handover, and a multicast control unit 62 comprises a multicast control instruction unit 62a and a control data transmission unit 62b. The multicast control instruction unit 62a notifies the multicast unit 43 of the handover base station candidates BTS2 to BTS4, and instructs the multicast unit 43 to perform a multicast, as well as decides the multicast transmission rate based on the communication capabilities of the handover base station candidates BTS2 to BTS4, and inputs that transmission rate to the transmission rate adjustment unit 45. The control data transmission unit 62b acquires and stores data from each of the handover base station candidates BTS2 to BTS4 such as the communication capability of each base station.

(c) Handover Control Sequence

Figure 19:
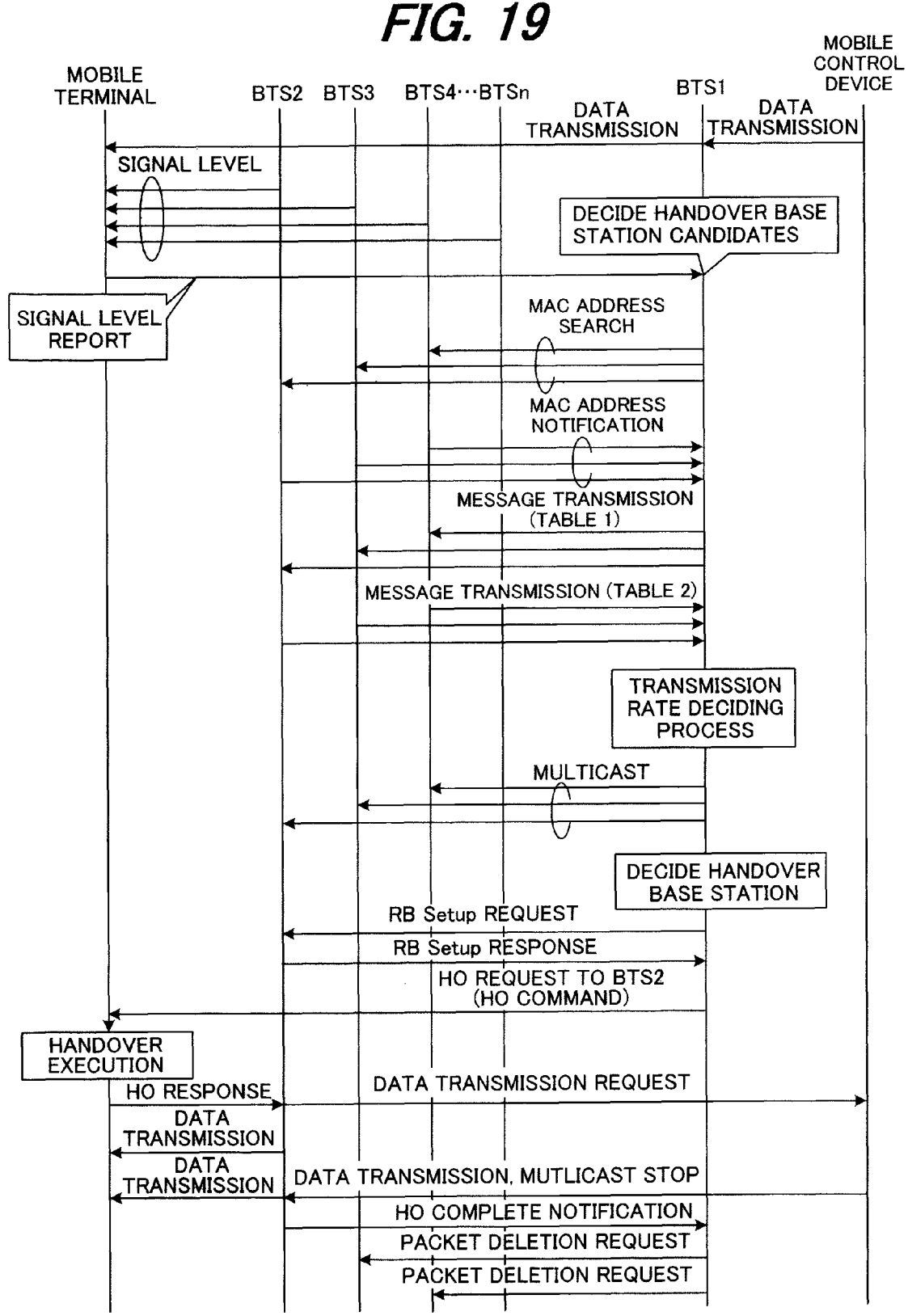
FIG. 19 is a drawing of a handover control sequence of a second embodiment.

FIG. 19 shows the handover control sequence of this second embodiment, where this sequence differs from the sequence shown in FIG. 4 in that the base station BTS1, which is in communication with the mobile terminal MS, performs handover/multicast control.

The handover control unit 61 of the base station BTS1 that is in communication with the mobile terminal MS periodically requests the mobile terminal MS to measure and report the radio communication status. After receiving the request to measure and report the radio communication status, the mobile terminal MS measures the reception levels from the surrounding base stations BTS2 to BTSn, and reports the levels to the base station BTS1 with which it is in communication.

The handover control unit 61 receives this report and makes reference to the reported signal levels to determine whether handover is necessary, and when handover is necessary, decides a plurality of base stations whose signal levels exceed a threshold value as handover base station candidates, and notifies the multicast control unit 62 of those handover base station candidates.

After the handover base station candidates have been set, the multicast control instruction unit 62a of the multicast control unit 62 checks whether the MAC address of each the base stations is known, and when there is an unclear MAC address, sends a MAC address search packet to acquire the interface address of that base station. After this processing is complete, the control data transmission unit 62b, acquires information indicating the communication capabilities of each of the handover base station candidates BTS2 to BTS4 by sending messages, and the multicast control instruction unit 62a uses that information indicating the communication capabilities to decide the multicast transmission rate.

After the multicast transmission rate is decided, the multicast control instruction unit 62a instructs the multicast unit 43 to perform a multicast, and inputs the multicast transmission rate to the transmission rate adjustment unit 45. The multicast unit 43 then copies the packets and inputs them to the transmission rate adjustment buffer units 44a to 44c. In order that the multicast unit 43 is able to distinguish between packets to be multicast and normal packets, identifiers are attached to the multicast packets.

The transmission rate adjustment unit 45 reads packets from the transmission rate adjustment buffer units 44a to 44c based on the multicast transmission rates that are decided for each of the handover base station candidates BTS2, BTS3, BTS4, and multicasts the packets to the handover base station candidates BTS2, BTS3, BTS4 by way of the transmission buffer units 47a to 47c.

At the same time that the multicast is being performed, the handover control unit 61 decides the handover base station (here, base station BTS2 is the handover base station). Next, the handover control unit 61 sends a request to the base station BTS2 to set a radio bearer (RB Setup request). After receiving a response from the base station BTS2 that a radio bearer has been set (RB Setup response), the handover control unit 61 sends a handover request to the mobile terminal MS (HO instruction). From this, the mobile terminal MS executes handover from the base station BTS1 to the base station BTS2, and after handover is complete, sends a handover response to the base station BTS2.

In accordance to the handover response, the base station BTS2 sends the multicast packets that were stored to the mobile terminal MS, and sends a data transmission request to the mobile control device MCA. After receiving the data transmission request, the mobile control device MCA stops the multicast, and sends packets received from the IP network to the mobile terminal by way of the base station BTS2. The base station BTS2 then sends a handover complete notification to the base station BTS1, and the multicast control instruction unit 62a of the base station BTS1 instructs the handover base station candidates BTS3, BTS4 that were not selected as the handover base station to delete the multicast packets.

A feature of this second embodiment of the invention is that the construction of the mobile communication system is simpler than in the first embodiment. That is, in the first embodiment, it was necessary for a mobile control device to be linked with the base stations in order to perform multicast transmission control, however, in the second embodiment, multicast transmission control can be performed by a base station alone.

(C) Third Embodiment (a) First Form of the Third Embodiment

In the first and second embodiments, the transmission rate during multicasting was not changed from the start until the end of a handover. However, since the communication status of a base station changes over time, the communication capability of a base station may change during a handover. This third embodiment of the invention takes into consideration the change in communication capability of a base station during a handover, where the mobile control device and base station have the construction shown in FIG. 2 and FIG. 3.

Figure 20:
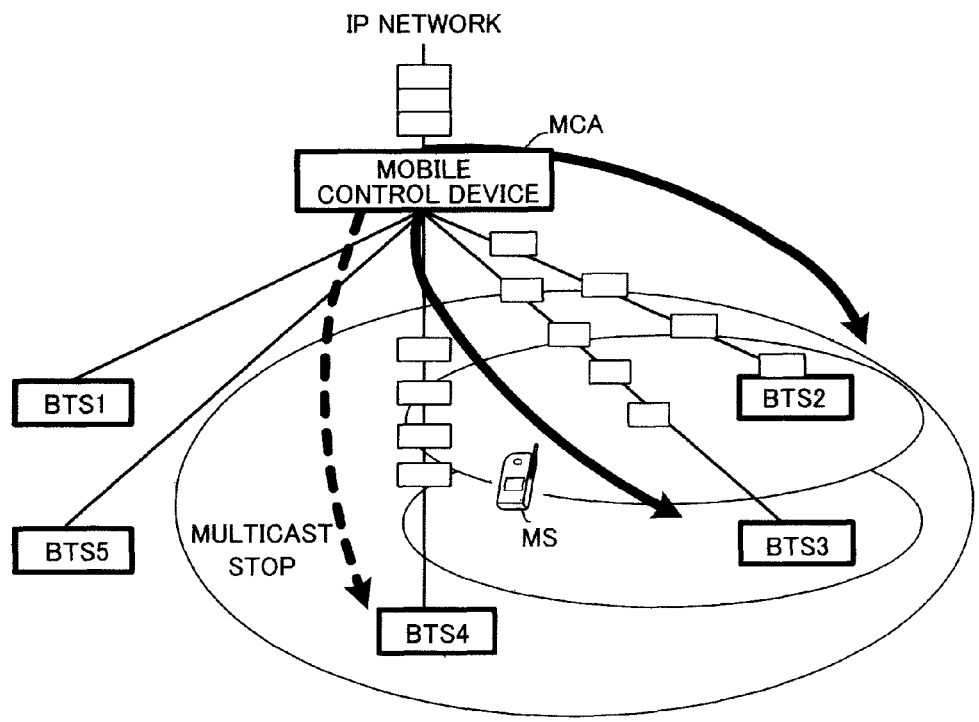
FIG. 20 is a drawing explaining a third embodiment of the invention.

FIG. 20 is a drawing showing an overview of this third embodiment, where the mobile control device MCA is a device on a higher order than the base stations BTSi. The mobile control device MCA is performing handover control according to movement of the mobile terminal MS, and is currently multicasting packets to the handover base station candidates BTS2, BTS3, BTS4. In this state, when the communication capability of the handover base station candidate BTS4 drops and packets are deleted due to buffer overflow, or when there are not enough radio communication resources, or when the mobile terminal cannot satisfy the required QoS, the mobile control device MCA stops multicasting to the handover base station candidate BTS4.

Figure 21:
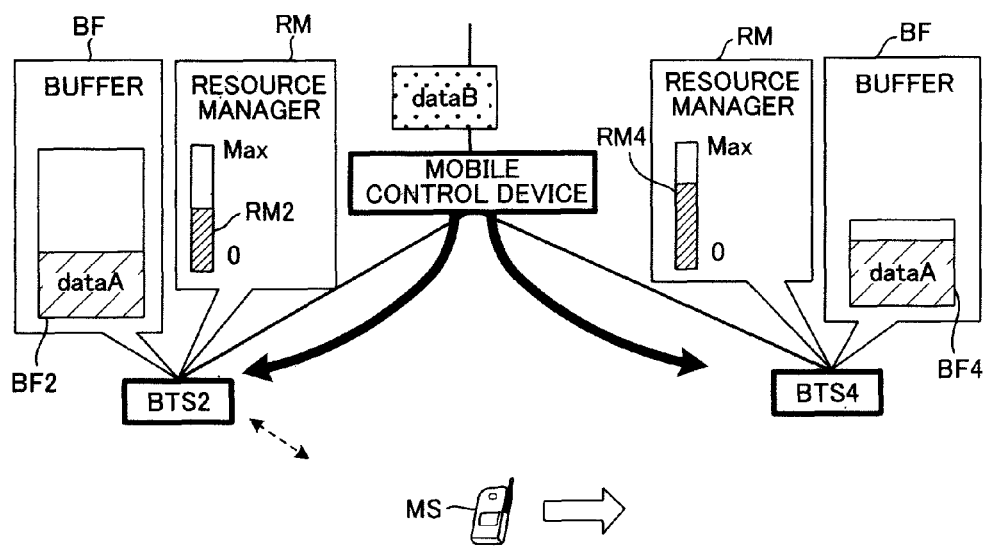
FIG. 21 is a drawing showing the state during handover.

FIG. 21 shows the state during handover, and shows the two handover base station candidates BTS2, BTS4. In the drawing, BF are buffers, and the buffer size of each base station is indicated by BF2 and BF4, the white areas indicate the empty part. In the figure, RM are resource managers, and the amount of resources (for example, bandwidth) of each base station is indicated by RM2 and RM4, and the white areas indicate the amount of unused resources (unused bandwidth).

At the start of the multicast of data A, the handover base station candidate BTS4 is able to maintain buffer capacity, however, during the multicast of data A, it becomes impossible for base station BTS4 to use the radio communication resources. This condition occurs when a mobile terminal that requires a higher level QoS than that of the current mobile terminal MS is newly connected to the handover base station candidate BTS4. The radio communication resources are assigned with priority to the mobile terminal that requires the high-level QoS, so there are not enough resources (insufficient bandwidth, etc.). When there are insufficient resources, the handover base station candidate BTS4 is no longer able to accommodate the mobile terminal MS with which it was communicating.

Figure 22:
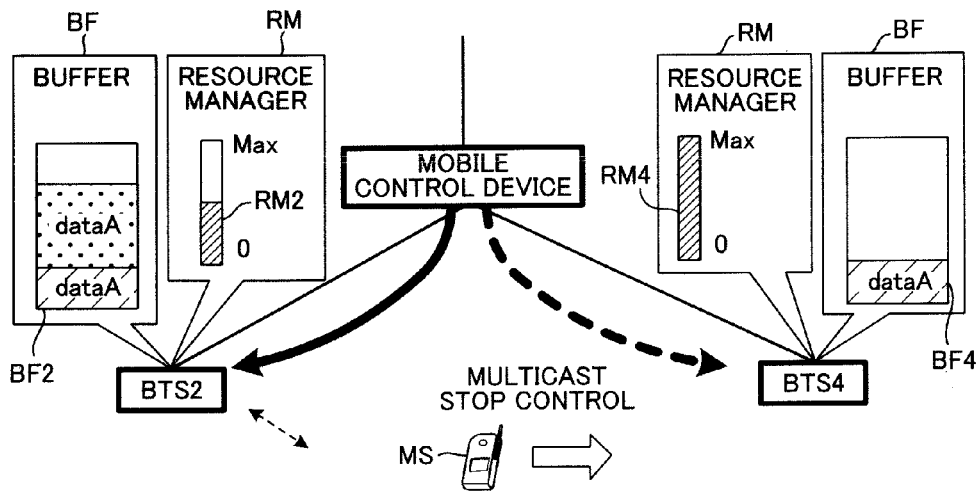
FIG. 22 is a drawing showing the state in which resource is insufficient in a handover base station and multicast to the handover base station candidates is stopped.

FIG. 22 shows the state in which resources become insufficient and multicast control to the handover base station candidate BTS4 is stopped.

In order to perform control to stop multicasting when resources become insufficient, a communication capability report message is sent to the mobile control device as shown in Table 4.

TABLE 4

Communication capability report message sent
adaptively by the base station

|  | BTS4 |
|---|---|
| (1) Buffer capacity | 192 Kb |
| (2) Availability state of resource | 0 |
| (3) Possibility of QoS | X |

When using the format shown in FIG. 7, this communication capability message becomes as shown in Table 5.

TABLE 5

Communication capability report message

| 00000100 | 00001000 | 1 11000000 001 | 1 0 | 0 0 | 0 0 |
|---|---|---|---|---|---|

After receiving the communication capability report message described above, the mobile control device MCA becomes aware that the radio communication resources can not be maintained, so removes the base station BTS4 as a handover base station candidate, as well as stops multicast transmission to base station BTS4 and notifies base station BTS4 that the multicast has been stopped. Also, together with notifying base station BTS4 that the multicast has been stopped, the mobile control device MCA instructs base station BTS4 to delete the packets that have been multicast. The instruction to delete packets is performed by sending the control message shown in Table 6 to the base station BTS4.

TABLE 6

Packet deletion control message
(X indicates that no check request is performed.)

|  | BTS4 |
|---|---|
| (1) Buffer capacity | X |
| (2) Availability state of resource | X |
| (3) Possibility of QoS | X |
| (4) Packet deletion | 1 |

When the format shown in FIG. 7 is used, the control message for deleting packets becomes as shown in Table 7.

TABLE 7

Packet deletion control message

| 00001000 | 000001000 | 0 0 | 0 0 | 0 0 | 1 1 |
|---|---|---|---|---|---|

With the control described above, the mobile control device MCA continues to multicast data A that arrives from an IP network to the handover base station candidates BTS2, BTS3 except base station BTS4 even though multicast transmission to base station BTS4 has been stopped.

Figure 23:
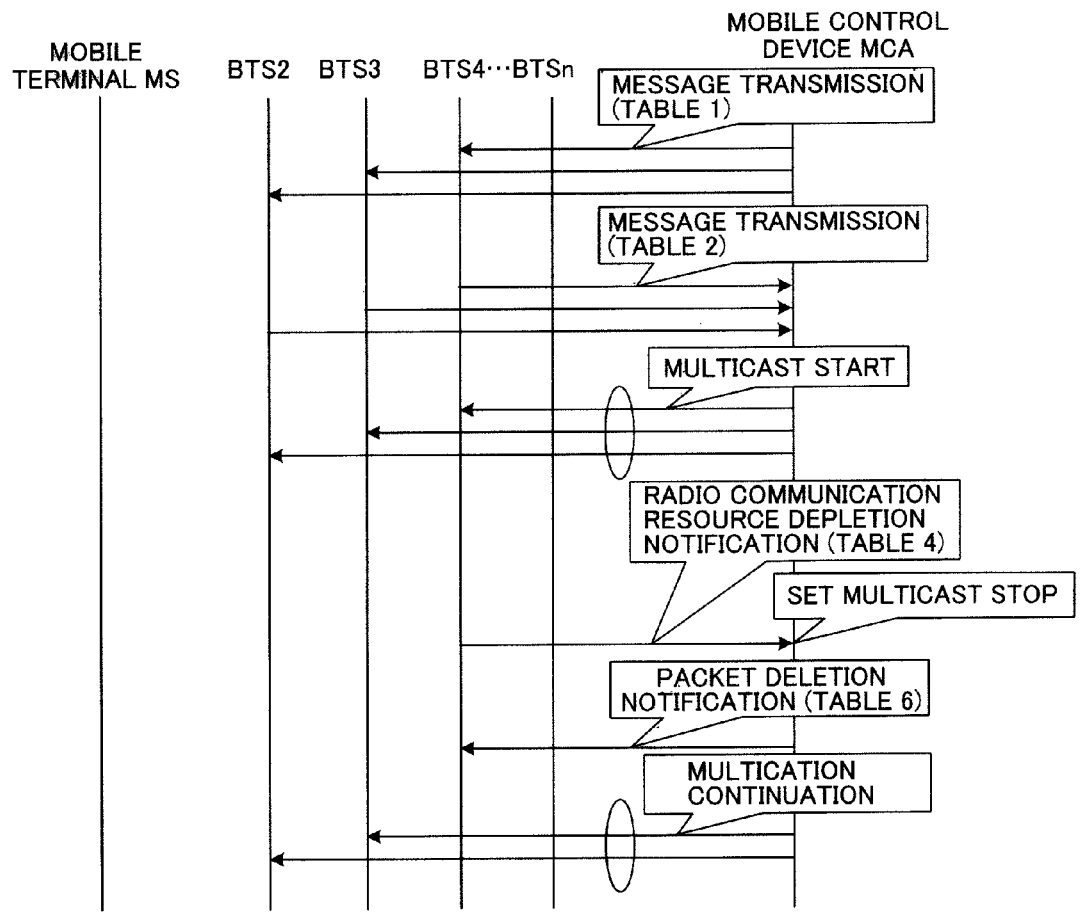
FIG. 23 is a drawing for explaining the main parts of a handover control sequence of a third embodiment of the invention.

FIG. 23 is a drawing showing the main parts of the handover control sequence of this third embodiment, and shows the sequence from the timing of sending the message for checking the communication capability (Table 1), up to the timing of continuing the multicast.

After the handover base station candidates have been decided, the mobile control device MCA sends messages to acquire information indicating the communication capabilities of the handover base station candidates BTS2 to BTS4, and uses that communication capability information to decide the multicast transmission rate.

After the multicast transmission rate has been decided, the mobile control device MCA starts the multicast. When the handover base station candidate BTS4 detects a change in the communication capability during that multicast, base station BTS4 sends the communication capability report message as shown in Table 4 to the mobile control device MCA. After receiving this communication capability report message, the mobile control device MCA stops multicast transmission to the base station BTS4, and sends the control message shown in Table 6 to base station BTS4 giving instruction to delete the multicast packets. After that, the mobile control device MCA continues to multicast packets arriving from the IP network to the handover base station candidates BTS2, BTS3. The sequence after that is the same as that shown in FIG. 4.

As was described above, with the first form of this third embodiment, by quickly removing a handover base station candidate as a destination of multicast transmission, and having the removed base station delete the packet that had been multicast up to that time, it is possible to use network resources more efficiently.

(b) Second Form of the Third Embodiment

In the first form of this third embodiment, the mobile control device MCA removed a handover base station candidate as a destination for a multicast due to the deterioration in communication capability of the base station, and stopped multicast transmission to that base station. However, there is also a possibility that radio communication resources will again become available and that the handover base station candidate BTS4 will become capable of accommodating the mobile terminal. Therefore, in this second form of the third embodiment, when it becomes impossible to use the radio communication resources of base station BTS4 due to a drop in communication capability, instead of quickly removing base station BTS4 as a destination of the multicast and stopping multicast transmission to base station BTS4, the multicast transmission rate to base station BTS4 is set to '0 ', and when the communication capability is restored, multicasting becomes possible.

Figure 24:
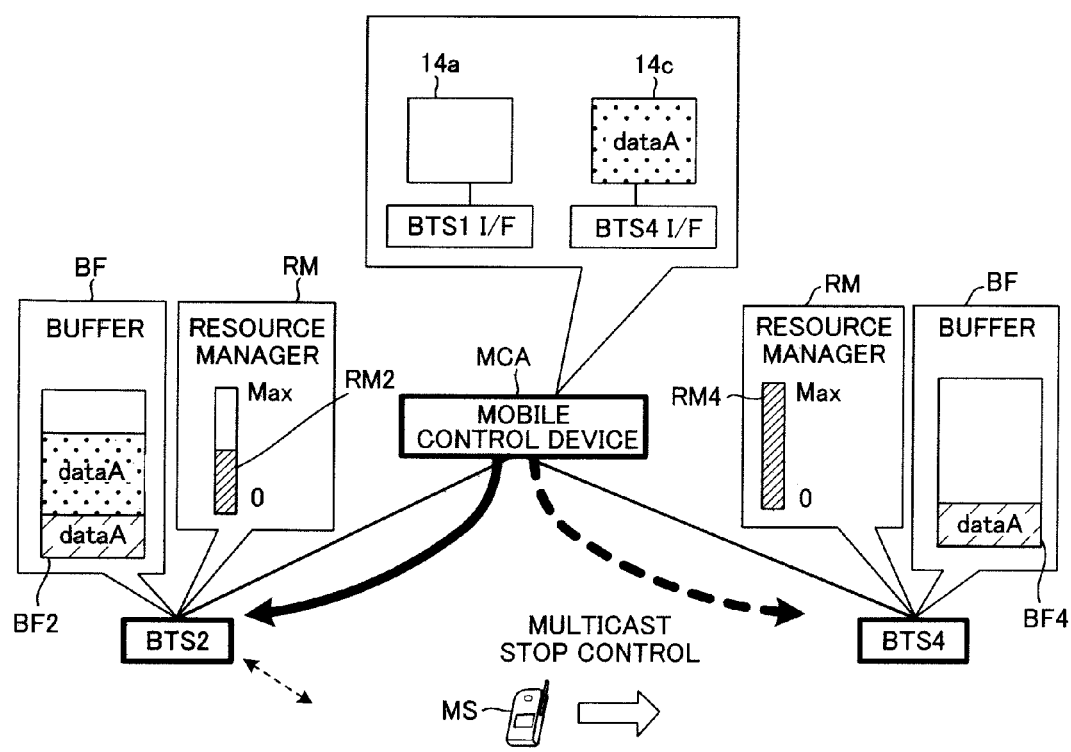
FIG. 24 is a drawing that shows a second form of the third embodiment.

FIG. 24 is a drawing for explaining this second form of the third embodiment, and shows the state in which when the radio communication resources of the handover base station candidate BTS4 become insufficient during multicasting of data A, the multicast transmission rate to base station BTS4 is set to '0'.

Data A that arrives from the IP network is sent in succession, so data is not retained in the transmission rate adjustment buffer 14a of the mobile control device MCA. On the other hand, when the multicast transmission rate to the handover base station candidate BTS4 is set to '0 ', data A that arrives from the IP network is not sent but retained in the transmission rate adjustment buffer 14c. However, when the communication capability of the handover base station candidate BTS4 is restored, the data that is retained in the transmission rate adjustment buffer 14c is sent to that base station BTS4.

Figure 25:
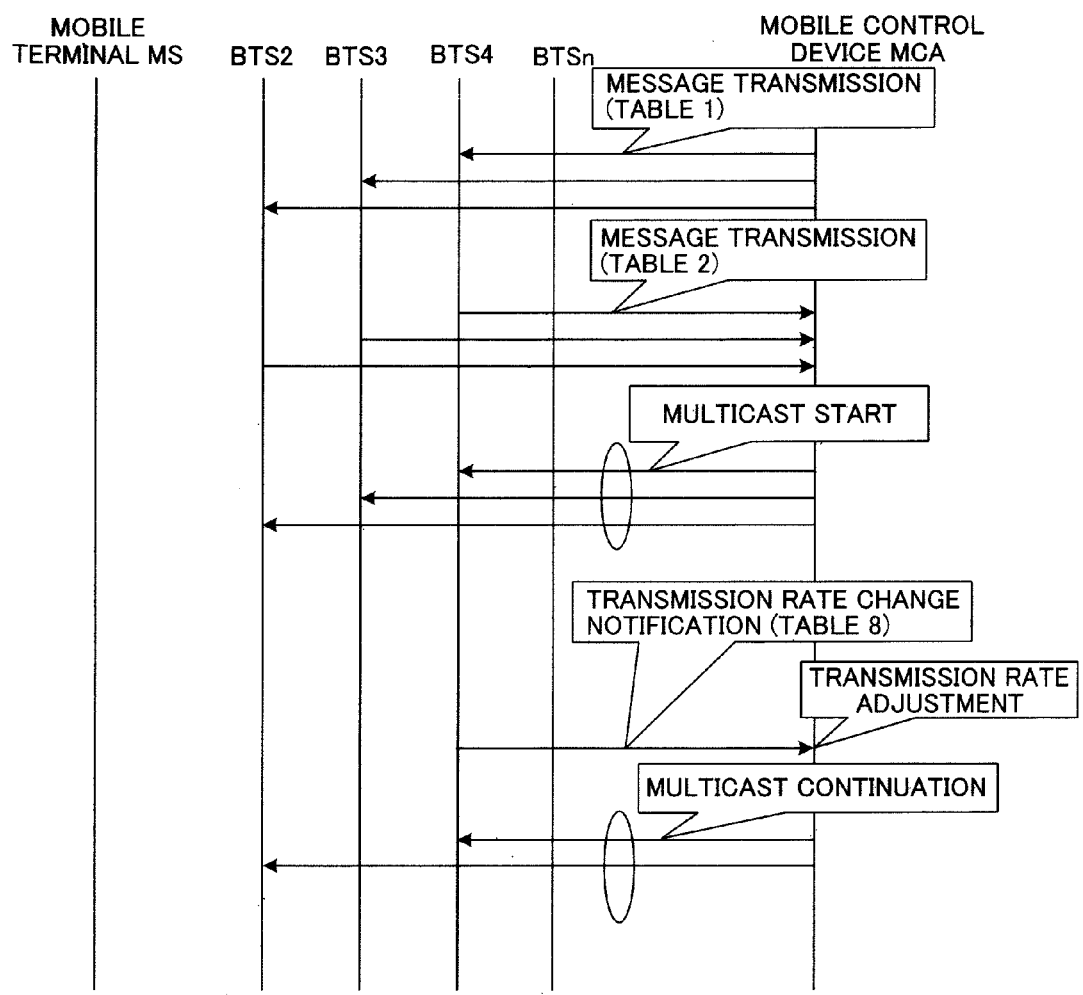
FIG. 25 is a drawing for explaining the main parts of a handover control sequence.

FIG. 25 is a drawing showing the main part of the handover control sequence of this second form of the third embodiment, and shows from the timing of sending the message for checking the communication capability (Table 1) until timing of the continuation of multicasting.

After the handover base station candidates have been decided, the mobile control device MCA exchanges messages in order to acquire information indicating the communication capabilities of each of the handover base station candidates BTS2 to BTS4, and uses the information indicating the communication capabilities to set multicast transmission rates. After the multicast transmission rates are decided, the mobile control device MCA starts the multicast. When the handover base station candidate BTS4 detects a change in communication capability during the multicast, the base station BTS4 sends a communication capability report message as shown in Table 8 to the mobile control device MCA.

TABLE 8

| Communication Capability Report Message | |
|---|---|
| | BTS4 |
| (1) Buffer capacity | 0 Kb |
| (2) Availability state of resource | 1 |
| (3) Possibility of QoS | X |

When the format shown in FIG. 7 is used, the communication capability report message packet becomes as shown in Table 9.

TABLE 9

| Communication Capability Report Message | | | | | |
|---|---|---|---|---|---|
| 00000100 | 00001000 | 1 00000000 000 | 1 1 | 0 0 | 0 0 |

After receiving this communication capability report message, since the availability state of resource is '1' (is '0' in table 4), and the buffer capacity is 0 Kb, the mobile control device MCA sets the multicast transmission rate to the base station BTS4 to '0'.

After that, the mobile control device MCA continues to multicast packets arriving from the IP network to the handover base station candidates BTS2 and BTS3. The sequence from this point is the same as that shown in FIG. 4.

In this second form of the third embodiment, when communication capability deteriorates the multicast transmission rate is set to '0', and when the communication capability is restored, the multicast transmission rate is returned, so multicasting can be continued.

(c) Third Form of the Third Embodiment

Figure 26:
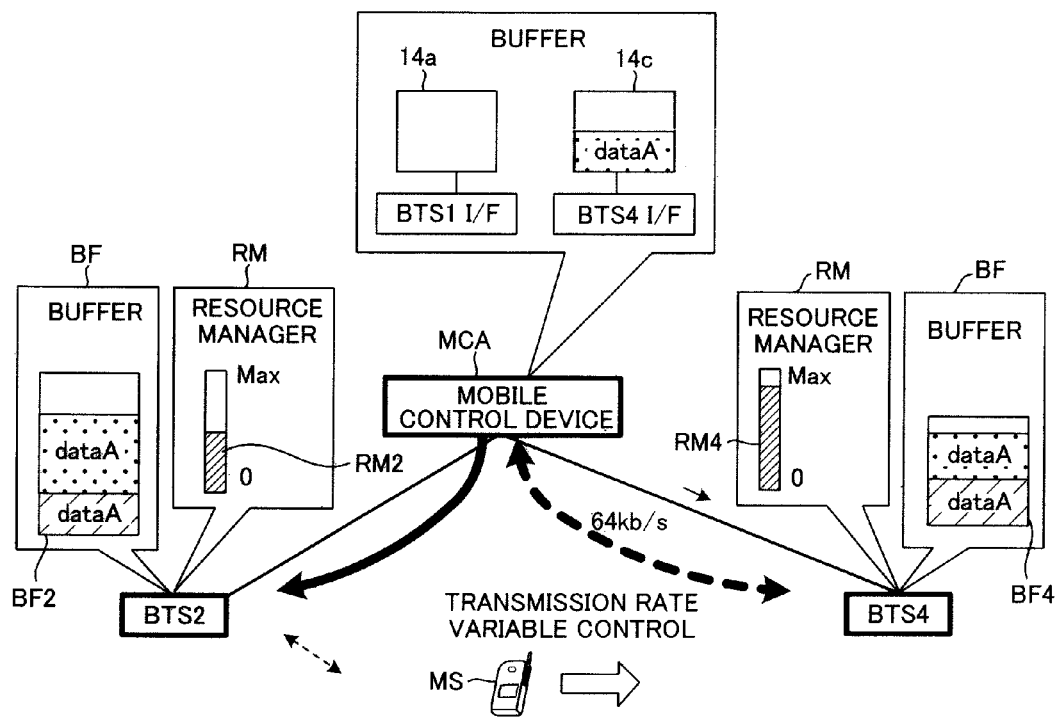
FIG. 26 is a drawing that shows a third form of the third embodiment.

In the second form of this embodiment, the case was described in which the handover base station candidate BTS4 was no longer able to accommodate the mobile terminal due to the deterioration in communication capability. However, by decreasing the transmission rate that the base station BTS4 provides to the mobile terminal, the base station BTS4 may be able to maintain some bandwidth for that mobile terminal MS and accommodate the mobile terminal MS. FIG. 26 is a drawing showing an overview of a third form of the third embodiment, and shows the state in which when the radio communication resources of the handover base station candidate BTS4 deteriorate during a multicast of data A, the mobile control device MCA sets the multicast transmission rate to the base station BTS4 to a transmission rate that corresponds to the radio communication resources of that base station.

In the second form of this embodiment, the multicast have been stopped by setting the multicast transmission rate to 0 Kb/s. However, in this third form, the multicast is continued by decreasing the transmission rate to the mobile terminal MS (for example, the transmission rate is changed from 384 Kb/s to 64 Kb/s).

The sequence in this third form is the same as that shown in FIG. 25, however, the report message that the base station BTS4 sends to the mobile control device MCA is different. That is, as shown in Table 8, in the second form the value of the buffer capacity was 0 Kb, however, as shown in Table 10, in this third form, during the handover time of 500 ms, in order to receive the data that is transmitted at a transmission rate of 64 Kb/s, the buffer capacity is taken to be the current usable bandwidth 32 Kb of the base station BTS4.

TABLE 10

| Communication Capability Report Message | |
|---|---|
| | BTS4 |
| (1) Buffer capacity | 32 Kb |
| (2) Availability state of resource | 1 |
| (3) Possibility of QoS | X |

When using the format shown in FIG. 7, the communication capability report message above becomes as shown in Table 11.

TABLE 11

| Communication Capability Report Message | | | | | |
|---|---|---|---|---|---|
| 00000100 | 00001000 | 1 00100000 000 | 1 1 | 0 0 | 0 0 |

The data A that arrives from the IP network is successively transmitted so data is not retained in the transmission rate adjustment buffer 14a of the mobile control device MCA. On the other hand, since the multicast transmission rate to the handover base station candidate BTS4 is less than the input rate for data A, the amount of data A that corresponds to this difference is not transmitted but is retained in the transmission rate adjustment buffer 14c.

In this third form of the third embodiment, when the communication capability of a handover base station candidate deteriorate, multicasting can be continued by setting the multicast transmission rate to that base station candidate to a value that corresponds to the remaining communication capability of that base station candidate, and even when that handover base station candidate is selected as the handover base station, communication with the mobile terminal can be performed.

(D) Fourth Embodiment (a) First Form

In the first embodiment of the invention, it is presumed that TCP is used as the end-to-end communication protocol. In this fourth embodiment of the invention, the case in which it is presumed that UDP (User Datagram Protocol) is used as the end-to-end communication protocol for realtime communication will be explained. Here, the mobile terminal MS performs streaming communication at 1 Mb/s, and the mobile terminal MS requires a QoS that satisfies this 1 Mb/s transmission rate.

Figure 27:
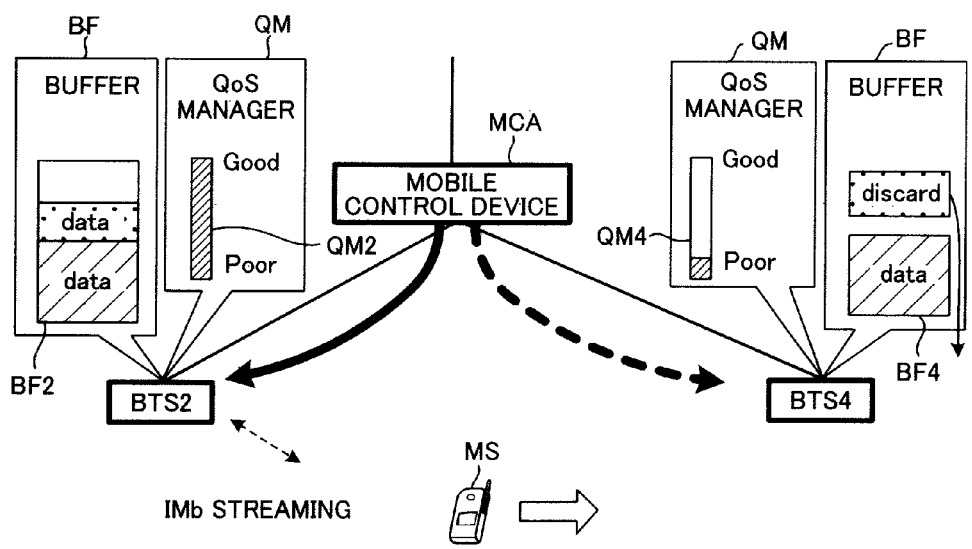
FIG. 27 is a drawing for explaining convention multicasting.
Figure 28:
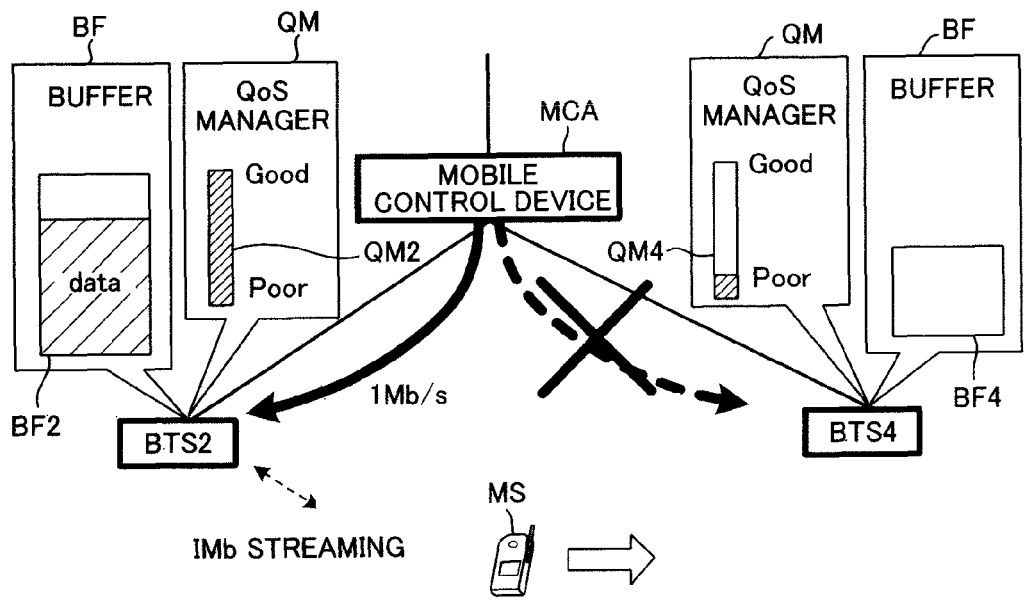
FIG. 28 is a drawing for explaining multicasting of a fourth embodiment of the invention.

FIG. 27 is a drawing for explaining a conventional multicast, and FIG. 28 is a drawing for explaining the multicast of this fourth embodiment of the invention, and shows two handover base station candidates BTS2 and BTS4. In FIG. 27 and FIG. 28, BF indicates buffers and the buffer sizes of the base stations are indicated by BF2 and BF4, and the white areas indicate the empty portions. In the figures, QM indicates QoS managers, and the level of possible QoS of each base station is indicated by QM2 and QM4.

In the conventional multicast shown in FIG. 27, the mobile control device MCA does not check whether or not it is possible for the handover base station candidate BTS4 to provide the QoS that is required by the mob 11e terminal.

Therefore, as shown in the figure, when it is not possible to satisfy the QoS required by the mobile terminal, packets are discarded due to buffer overflow and useless multicast is performed, and thus network resources are wasted.

However, in this fourth embodiment, the mobile control device MCA acquires the communication capabilities of each of the handover base station candidates before starting the multicast, and is able to become aware of whether or not the handover base station candidate BTS4 is able to provide the QoS required by the mobile terminal. Moreover, by determining that it is not possible for the base station BTS4 to provide the QoS required by the mobile terminal, the mobile control device MCA removes the handover base station candidate BTS4 as a multicast destination, and does not multicast data that is transferred from the streaming server of the communicating party. By doing this, it is possible to prevent packets from being discarded when the QoS cannot be satisfied, and thus it is possible to more effectively use the network resources.

(b) Second Form

Even when a handover base station candidate for the mobile terminal MS is not able to perform 1 Mb/s streaming communication that is required by the mobile terminal as the QoS, it is possible to maintain and continue streaming communication by lower the quality of the images and sound. In the second form of this embodiment, when the mobile terminal requests that streaming communication be continued even though it is not possible to satisfy the QoS that is required by the mobile terminal, a multicast is performed at a transmission rate that corresponds to the QoS that the handover base station candidate can provide.

Figure 29:
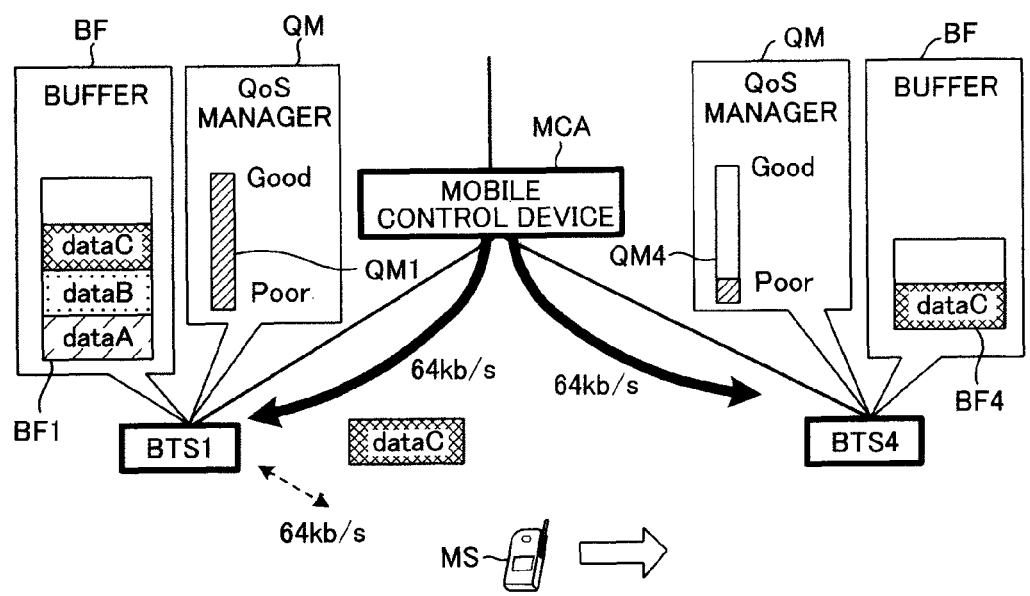
FIG. 29 is a drawing for explaining a second form of multicasting of the fourth embodiment.
Figure 30:
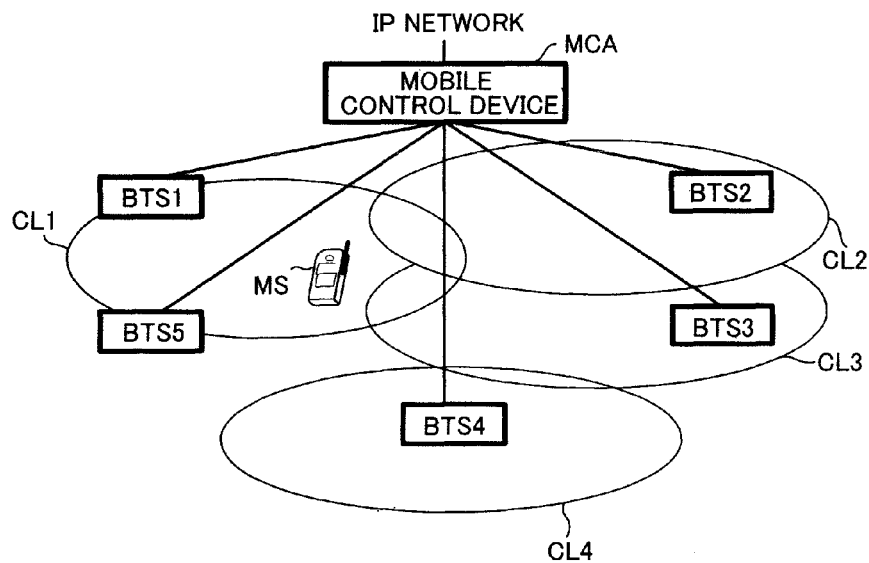
FIG. 30 is a drawing showing the construction of a mobile communication system that uses IP (Internet Protocol).
Figure 31:
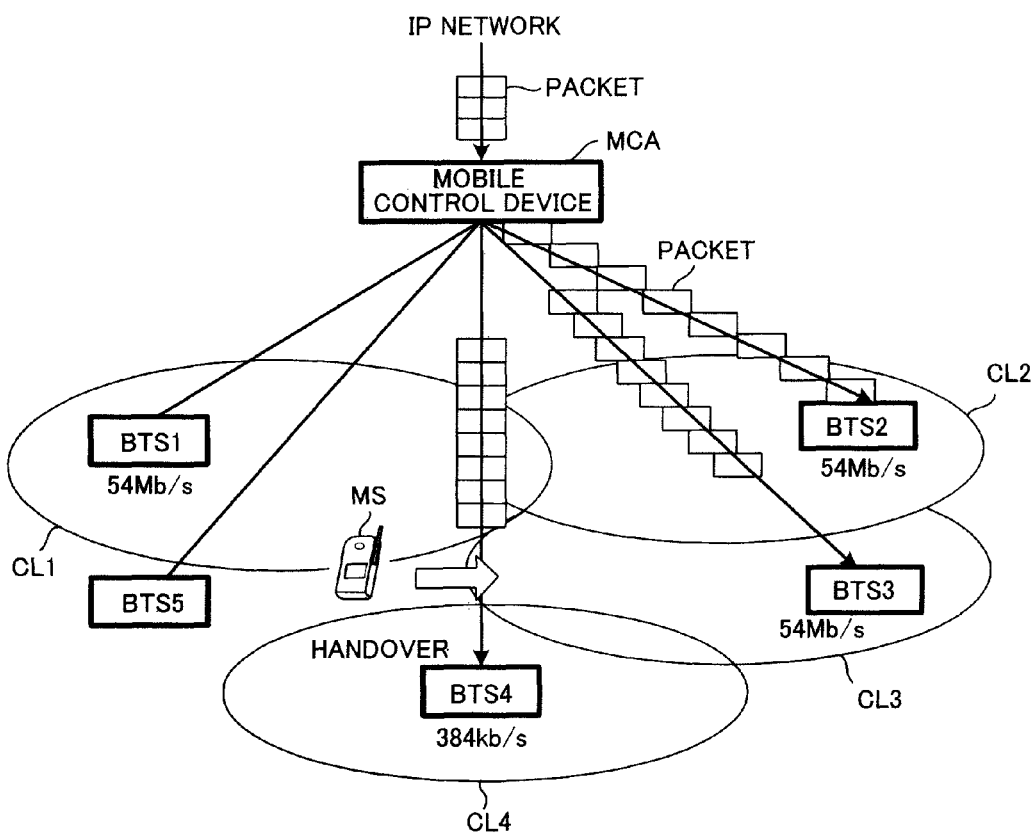
FIG. 31 is a drawing for explaining multicasting during handover.
Figure 32:
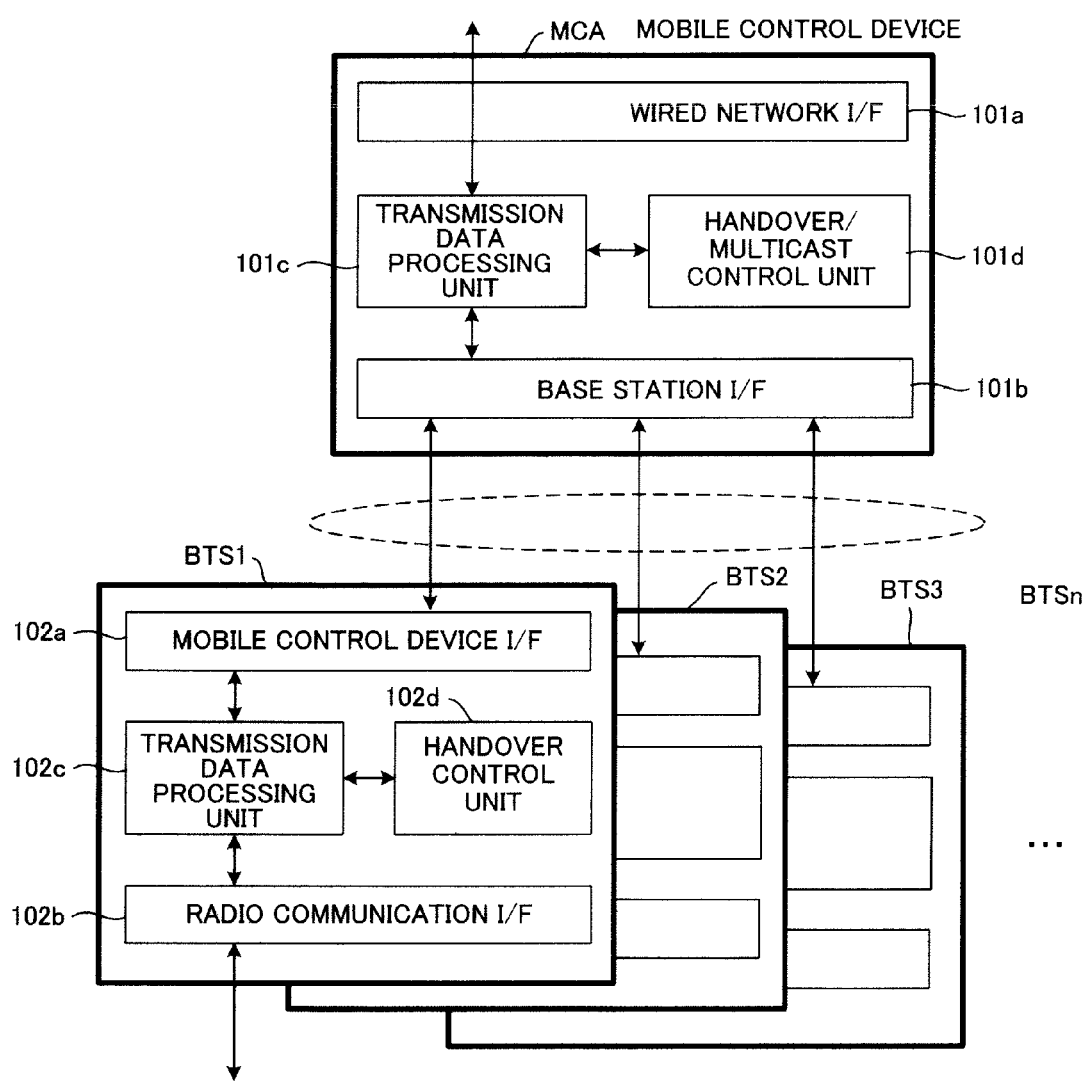
FIG. 32 is a drawing showing an example of construction of a mobile control device and base station device.
Figure 33:
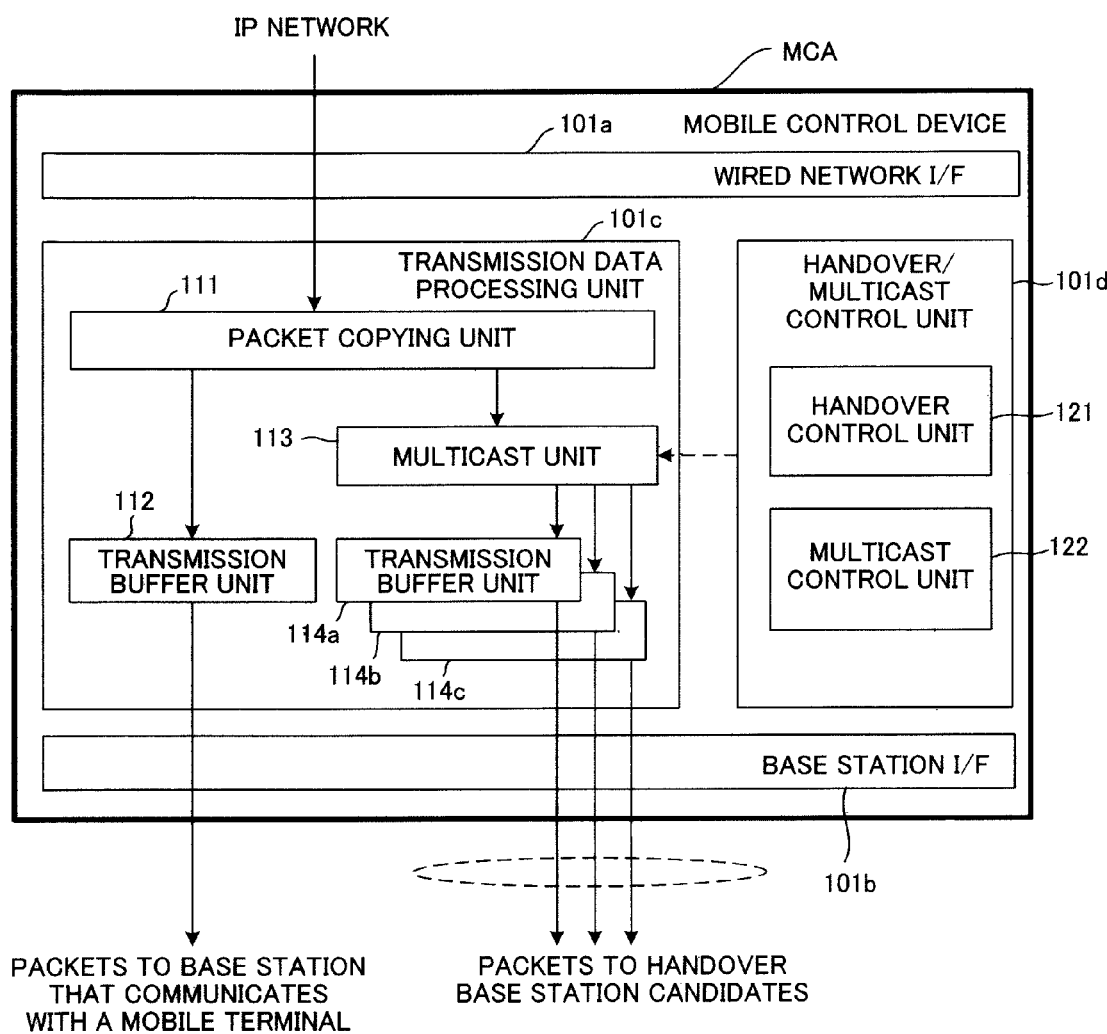
FIG. 33 is a drawing showing the detailed construction of a mobile control device.
Figure 34:
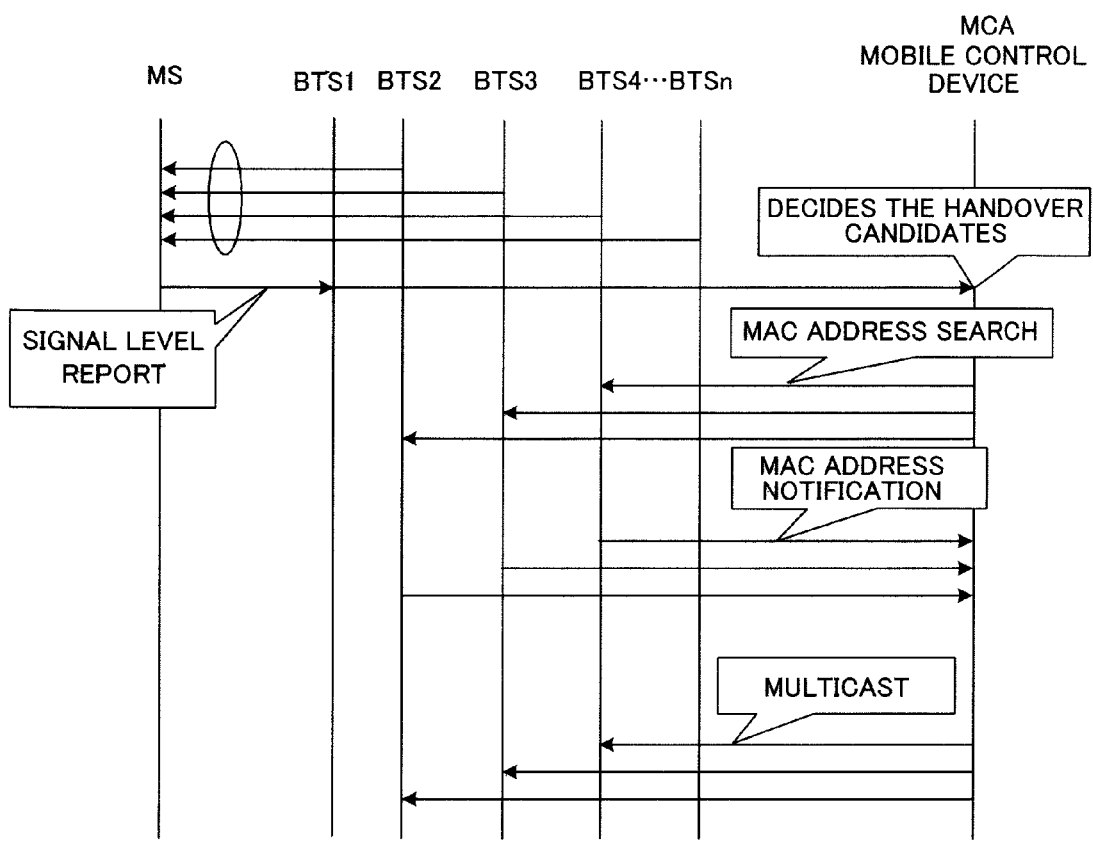
FIG. 34 is a drawing for explaining the main parts of a handover control sequence when using multicasting.
Figure 35:
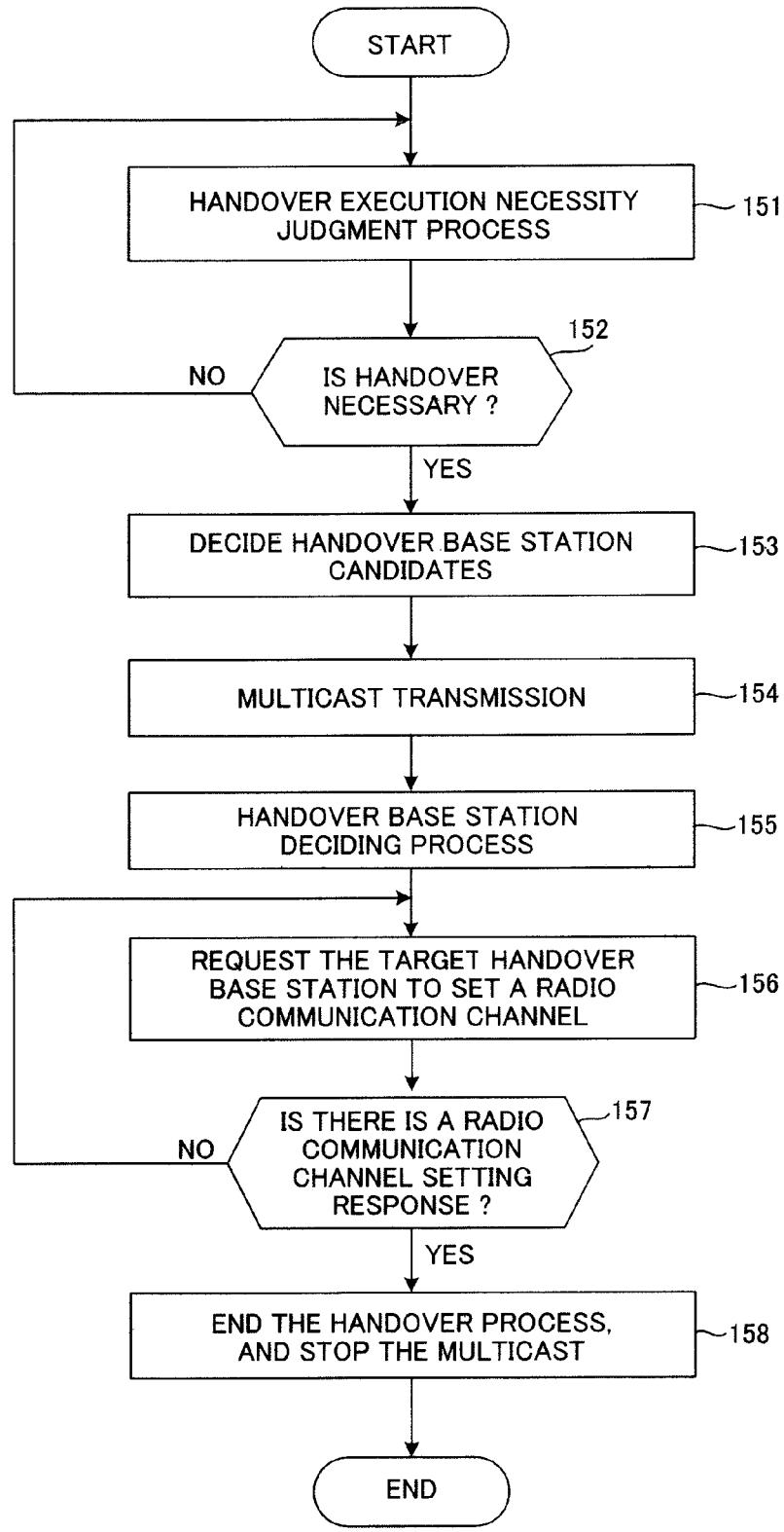
FIG. 35 is a flowchart of processing by the handover/multicast control unit.
Figure 36:
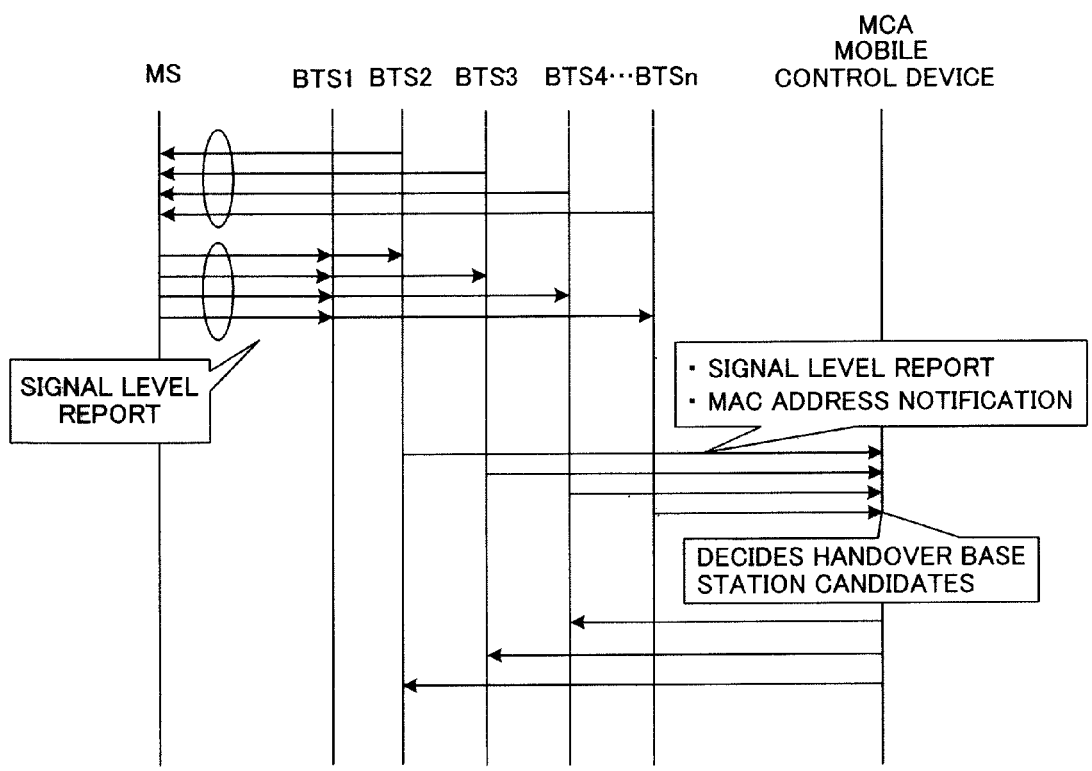
FIG. 36 is a drawing for explaining the main parts of another handover control sequence.

FIG. 29 is a drawing explaining a second form of the multicast of this fourth embodiment of the invention, where the same reference numbers are given to parts that are identical to those shown in FIG. 28. The mobile control device MCA makes reference to the buffer capacity that is reported by the handover base station candidate BTS4 before the start of the handover, and as long as the steaming rate is 64 Kb/s, determines that there is allowable capacity, and transmits data B that has been encoded at a transmission rate of 1 Mb/s to the handover base station candidate BTS1 at the transmission rate of 64 kb/s. By doing this, the mobile terminal MS receives data B at a transmission rate of 64 Kb/s, and detects degradation of the streaming transmission rate and notifies the streaming server to decrease both the encoding rate and the transmission rate from 1 Mb/s to 64 Kb/s. After that, the data that is transmitted from the mobile control device MCA is shown as data C in FIG. 29.

After detecting that the transmission rate of data C has dropped to 64 Kb/s, the mobile control device MCA performs multicast transmission to the handover base station candidates BTS2 and BTS4 at that detected timing. As described above, before handover to the handover base station candidate BTS4, the streaming transmission rate to the mobile terminal MS is decreased, so even though handover is made to the handover base station candidate BTS4, the mobile terminal is able to receive data at a streaming rate of 64 Kb/s.

Moreover, as was described above, it becomes possible to adaptively change the QoS beforehand at a base station that is capable of large-volume and high-speed communication before handover, and by doing so, it is possible to prevent the loss of packets, and it is possible to perform streaming communication after handover.

(E) Effect of the Invention

With the present invention, the multicast transmission rate is decided during handover control to correspond with the communication capabilities of each of the handover base station candidates, so network resources can be used more efficiently, and high-speed handover becomes possible.

Moreover, with the present invention, it is possible to reduce degradation of the throughput after handover, as well as it is possible to quickly provide good quality communication and to increase the amount of communication of the entire system.

What is claimed is:

1. A base station in a mobile communication system that performs control of handover where a mobile terminal changes base stations which communicate with the mobile terminal, as the mobile terminal moves, and the base station comprising:
   a handover base station candidate decision unit that selects one or more handover base station candidates based on the communication state during communication with a mobile terminal;
   a multicast unit that, based on data transmission condition received from each handover base station candidate, transmits communication data that is transmitted to the mobile terminal, to the one or more handover base station candidates; and
   a handover base station decision unit that decides one of the plurality of handover base station candidates as a handover base station.

2. The base station according to claim 1, wherein the multicast unit transmits the communication data to each of the handover base station candidates by way of a host device.

3. The base station according to claim 1, wherein said respective transmission conditions include transmission rates at which the communication data is respectively transmitted to the handover base station candidates.

4. The base station according to claim 1, wherein each of the handover base station candidates saves the transmitted communication data, and a handover base station candidate that is decided as the handover base station sends the saved communication data to the mobile terminal.

5. A mobile communication system that comprises a mobile terminal and a base station which communicates with the mobile station, and performs control of handover where said mobile terminal changes base stations which communicate with the mobile terminal, as the mobile terminal moves, wherein said base station includes:
   a handover base station candidate decision unit that selects one or more handover base station candidates based on the communication state during communication with a mobile terminal;
   a multicast unit that, based on data transmission condition received from each handover base station candidate, transmits communication data that is transmitted to the mobile terminal, to the one or more handover base station candidates; and
   a handover base station decision unit that decides one of the plurality of handover base station candidates as a handover base station, and
   said mobile terminal includes a receiver that receives the communication data that is transmitted from a handover base station candidate that has been decided as the handover base station.

* * * * *